US011582118B2

(12) United States Patent
Momchilov et al.

(10) Patent No.: US 11,582,118 B2
(45) Date of Patent: Feb. 14, 2023

(54) REAL-TIME SCALABLE VIRTUAL SESSION AND NETWORK ANALYTICS

(71) Applicant: Citrix Systems, Inc., Fort Lauderdale, FL (US)

(72) Inventors: Georgy Momchilov, Parkland, FL (US); Kirankumar Alluvada, Bengaluru (IN); Jong Kann, Santa Clara, CA (US); Jayadev Marulappa Niranjanmurthy, Parkland, FL (US); Kupuswamy Ramamurthy, Fort Lauderdale, FL (US); Corneliu Chetan, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/684,342

(22) Filed: Nov. 14, 2019

(65) Prior Publication Data
US 2020/0162356 A1    May 21, 2020

Related U.S. Application Data

(60) Provisional application No. 62/767,947, filed on Nov. 15, 2018.

(51) Int. Cl.
*H04L 41/5067* (2022.01)
*H04L 41/5009* (2022.01)
(Continued)

(52) U.S. Cl.
CPC .......... *H04L 41/5067* (2013.01); *G06F 9/452* (2018.02); *G06F 9/45558* (2013.01);
(Continued)

(58) Field of Classification Search
CPC .......... G06F 2009/45595; G06F 9/452; G06F 9/45558; H04L 12/4633; H04L 41/046;
(Continued)

(56) References Cited

U.S. PATENT DOCUMENTS 6,967,954 B2    11/2005 Sugiyama
7,653,749 B2    1/2010 Coleman et al.
(Continued)

OTHER PUBLICATIONS

Citrix Support Knowledge Center, Citrix ICA Virtual Channels Overview, Jan. 4, 2017, Retrieved via URL: https://support.citrix.com/article/CTX 116890 (Year: 2017).
(Continued)

*Primary Examiner* — Zhensheng Zhang

(57) ABSTRACT

Provided herein are systems and methods for providing insights or metrics in connection with provisioning applications and/or desktop sessions to end-users. Network devices (e.g., appliances, intermediary devices, gateways, proxy devices or middle-boxes) can gather insights such as network-level statistics. Additional insights (e.g., metadata and metrics) associated with virtual applications and virtual desktops can be gathered to provide administrators with comprehensive end-to-end real-time and/or historical reports of performance and end-user experience (UX) insights. Insights relating to an application or desktop session can be used to determine and/or improve the overall health of the infrastructure of the session, Citrix Virtual Apps and Desktops, the applications (e.g., remote desktop application) being delivered using the infrastructure, and/or the corresponding user experience.

20 Claims, 19 Drawing Sheets

(51) Int. Cl.
| | |
|---|---|
| *H04L 12/46* | (2006.01) |
| *G06F 9/455* | (2018.01) |
| *H04L 41/046* | (2022.01) |
| *H04L 43/0864* | (2022.01) |
| *H04L 41/14* | (2022.01) |
| *H04L 67/141* | (2022.01) |
| *G06F 9/451* | (2018.01) |
| *H04L 43/08* | (2022.01) |
| *H04L 67/08* | (2022.01) |
| *H04L 67/10* | (2022.01) |
| *H04L 67/01* | (2022.01) |
| *H04L 67/51* | (2022.01) |
| *H04L 67/56* | (2022.01) |

(52) U.S. Cl.
CPC ........ *H04L 12/4633* (2013.01); *H04L 41/046* (2013.01); *H04L 41/14* (2013.01); *H04L 41/5016* (2013.01); *H04L 43/08* (2013.01); *H04L 43/0864* (2013.01); *H04L 67/01* (2022.05); *H04L 67/08* (2013.01); *H04L 67/10* (2013.01); *H04L 67/141* (2013.01); *H04L 67/51* (2022.05); *H04L 67/56* (2022.05); *G06F 2009/45595* (2013.01)

(58) Field of Classification Search
CPC ... H04L 41/14; H04L 41/142; H04L 41/5016; H04L 41/5067; H04L 43/08; H04L 43/0864; H04L 67/08; H04L 67/10; H04L 67/141; H04L 67/16; H04L 67/28; H04L 67/42; H04L 69/04; H04L 69/24
See application file for complete search history.

(56) References Cited

U.S. PATENT DOCUMENTS

| | | | |
|---|---|---|---|
| 8,577,937 | B1 | 11/2013 | Offer |
| 8,780,898 | B2 | 7/2014 | Moriarty et al. |
| 8,788,822 | B1 | 7/2014 | Riddle |
| 9,723,091 | B1* | 8/2017 | Krock ............ H04L 67/40 |
| 9,742,758 | B1 | 8/2017 | Sharifi Mehr |
| 9,813,341 | B1 | 11/2017 | Tailor et al. |
| 10,025,304 | B1* | 7/2018 | Stubbs ............ G01S 11/026 |
| 10,250,673 | B1 | 4/2019 | Brooker et al. |
| 10,721,142 | B1 | 7/2020 | Mathur et al. |
| 11,271,828 | B2 | 3/2022 | Momchilov et al. |
| 2002/0073061 | A1 | 6/2002 | Collins |
| 2006/0039350 | A1 | 2/2006 | Sturrock et al. |
| 2006/0059107 | A1 | 3/2006 | Elmore et al. |
| 2006/0195881 | A1 | 8/2006 | Segev et al. |
| 2007/0046980 | A1 | 3/2007 | Coleman et al. |
| 2008/0285578 | A1 | 11/2008 | Delay et al. |
| 2009/0037998 | A1 | 2/2009 | Adhya et al. |
| 2009/0165066 | A1 | 6/2009 | Brouda |
| 2011/0276699 | A1 | 11/2011 | Pedersen |
| 2011/0276993 | A1 | 11/2011 | Ferguson |
| 2012/0226742 | A1 | 9/2012 | Momchilov et al. |
| 2013/0136125 | A1 | 5/2013 | Jain et al. |
| 2013/0339529 | A1 | 12/2013 | Rizzo et al. |
| 2015/0003247 | A1 | 1/2015 | Mejia et al. |
| 2015/0128110 | A1 | 5/2015 | Falk et al. |
| 2015/0200845 | A1 | 7/2015 | Roskind |
| 2016/0105727 | A1 | 4/2016 | Yim et al. |
| 2016/0173811 | A1 | 6/2016 | Oh et al. |
| 2016/0212031 | A1 | 7/2016 | Jain et al. |
| 2016/0234216 | A1 | 8/2016 | Fausak et al. |
| 2016/0345347 | A1* | 11/2016 | Cheng ............ H04L 25/00 |
| 2016/0380860 | A1 | 12/2016 | Singhal |
| 2017/0026980 | A1 | 1/2017 | Krishna et al. |
| 2017/0078406 | A1 | 3/2017 | Ruge |
| 2017/0149738 | A1 | 5/2017 | Zheng et al. |
| 2017/0230853 | A1 | 8/2017 | Wright et al. |
| 2017/0317932 | A1 | 11/2017 | Paramasivam |
| 2017/0353372 | A1* | 12/2017 | Suzuki ............ H04L 43/0864 |
| 2018/0083850 | A1 | 3/2018 | Rabipour et al. |
| 2018/0091483 | A1 | 3/2018 | Eiriksson et al. |
| 2018/0167420 | A1 | 6/2018 | Shukla et al. |
| 2018/0219879 | A1 | 8/2018 | Pierce |
| 2019/0215254 | A1* | 7/2019 | Yoshida ............ H04L 43/087 |
| 2019/0268921 | A1 | 8/2019 | Jiang et al. |
| 2020/0313970 | A1 | 10/2020 | Almasmoum et al. |
| 2020/0412833 | A1 | 12/2020 | Yang et al. |

OTHER PUBLICATIONS

Non-Final Office Action on U.S. Appl. No. 16/588,280 dated Mar. 8, 2021.
Non-Final Office Action on U.S. Appl. No. 16/684,244 dated Feb. 17, 2021.
Non-Final Office Action on U.S. Appl. No. 16/684,298 dated Mar. 4, 2021.
International Search Report and Written Opinion on PCT Appl No. PCT/US2020/033546 dated Dec. 9, 2020.
Partial International Search Report on PCT Appl. No. PCT/US2020/033546 dated Oct. 7, 2020.
Final Office Action on U.S. Appl. No. 16/588,280 dated Aug. 3, 2021.
Non-Final Office Action on U.S. Appl. No. 16/588,616 dated Jun. 1, 2021.
Non-Final Office Action on U.S. Appl. No. 16/588,638 dated Jul. 22, 2021.
Non-Final Office Action on U.S. Appl. No. 16/684,288 dated May 13, 2021.
U.S. Office Action on U.S. Appl. No. 16/684,244 dated Jul. 2, 2021.
Advisory Action on U.S. Appl. No. 16/684,244, dated Sep. 14, 2021.
Final Office Action on U.S. Appl. No. 16/684,298 dated Aug. 31, 2021.
Notice of Allowance on U.S. Appl. No. 16/684,288 dated Sep. 8, 2021.
Final Office Action on U.S. Appl. No. 16/588,616 dated Dec. 10, 2021.
International Preliminary Report on Patentability on PCT Appl. No. PCT/US2020/033546 dated Dec. 2, 2021.
Non-Final Office Action on U.S. Appl. No. 16/588,280 dated Dec. 29, 2021.
Notice of Allowance on U.S. Appl. No. 16/684,298 dated Dec. 13, 2021.
Notice of Allowance on U.S. Appl. No. 16/684,244 dated Nov. 1, 2021.
Final Office Action on U.S. Appl. No. 16/588,638 dated Feb. 18, 2022.
Non-Final Office Action on U.S. Appl. No. 16/588,616 dated Apr. 13, 2022.
Non-Final Office Action on US No. U.S. Appl. No. 16/588,638 dated Jun. 23, 2022.
Notice of Allowance on U.S. Appl. No. 16/588,280 dated Jul. 20, 2022.
Examination Report on AU Appl. No. 2020279972 dated Oct. 13, 2022 (4 pages).
Final Office Action on U.S. Appl. No. 16/588,616 dated Dec. 14, 2022 (31 pages).
Non-Final Office Action on U.S. Appl. No. 17/536,587 dated Sep. 23, 2022 (17 pages).
Non-Final Office Action on U.S. Appl. No. 17/567,644 dated Oct. 25, 2022 (12 pages).

* cited by examiner

REAL-TIME SCALABLE VIRTUAL SESSION AND NETWORK ANALYTICS

CROSS-REFERENCES TO RELATED APPLICATIONS

The present application claims priority under 35 U.S.C. § 119(e) to U.S. Provisional Patent Application No. 62/767,947, titled "REAL-TIME SCALABLE VIRTUAL SESSION AND NETWORK ANALYTICS," filed Nov. 15, 2018, which is incorporated herein by reference in its entirety.

FIELD OF THE DISCLOSURE

The present application generally relates to communicating insights such as application and/or desktop performance and end-user experience insights, including but not limited to systems and methods for real-time scalable virtual session and network analytics.

BACKGROUND

In a network computing environment, insights and metrics about application and/or desktop performance, and on end-user experience, can be used to determine the health of the network computing environment such as the associated application or desktop delivery platform.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

Described herein are systems and methods for providing insights or metrics in connection with provisioning applications and/or desktop sessions to end-users. Network devices (e.g., appliances, intermediary devices, gateways, proxy devices or middle-boxes) such as Citrix Gateway and Citrix software-defined wide area network (SD-WAN) devices can gather insights such as network-level statistics. Additional insights (e.g., metadata and metrics) associated with virtual applications and virtual desktops can be gathered to provide administrators with comprehensive end-to-end real-time and/or historical reports of performance and end-user experience (UX) insights. Insights relating to an application or desktop session can be used to determine and/or improve the overall health of the infrastructure of the session (e.g., XenApp/XenDesktop infrastructure), the applications (e.g., Microsoft Office applications, remote desktop application) being delivered using the infrastructure, and/or the corresponding user experience. The insights can be combined with other network-health analysis performed by network devices, and/or processed by the network devices (e.g. Citrix Gateway or Citrix SD-WAN). In addition, such collective insights may be provided to a management and triaging utility (e.g. Citrix Director), a management analytics service, or a third party collector tool. The collective insights and/or these tools can allow administrators to view and analyze real-time client, host and network latency metrics, historical reports and/or end-to-end performance data, and can allow the administrators to troubleshoot performance and network issues. However, to obtain the insights, the network devices may have to perform deep parsing of virtualization protocols such as Citrix independent computing architecture (ICA) along with some or all virtual channels (VCs), which can demand or entail knowledge of all underlying protocol details, and can be resource intensive.

To address these and other challenges, the present disclosure provides embodiments of methods and systems for providing or delivering insights of a virtual session to a network device in a real-time, scalable and/or extensible manner. In some embodiments, a separate or independent VC (sometimes referred to as an App Flow VC, app flow VC or insights VC) can be established across or between a client-side agent (e.g., desktop virtualization client), network device(s) and a server-side agent (e.g., virtual delivery agent (VDA)) for the transmission of insights (e.g., virtualization session insights). The App Flow VC can be negotiated between these entities (e.g., between the desktop virtualization client, network appliances and VDA). The App Flow VC can facilitate scalable and extensible processing of insights.

Some embodiments of the present methods and system provide or support state transition of App Flow insights or metrics (sometimes referred to as app flow or insights) during network device failover (e.g., high-availability failover). Certain embodiments of the present methods and system provide or support efficient identification and prioritization of MSI HDX streams. Some embodiments of the present methods and system provide or support layer 7 (L7, application layer) latency calculation and communication independent of host processing time. Some embodiments of the present methods and system provide or support L7 latency calculation and communication between multiple network devices.

At least one aspect of the present disclosure is directed to systems, methods, and non-transitory computer readable media for negotiation and establishment of independent app flow virtual channels. A first computing device may send a request message to a second computing device via an intermediary device. The request message may be indicative of a capability of the first computing device to support an insights virtual channel (VC) between the first computing device and the second computing device. The first computing device may receive, responsive to the request message, a response message. The response message may include an indication of a capability of the second computing device and an indication of a capability of the intermediary device, to support the insights VC. The first computing device may establish, according to the capabilities of the first computing device, the second computing device and the intermediary device, the insights VC to communicate insights for use by at least one of the first computing device, the second computing device or the intermediary device.

In some embodiments, the request message may include a highest of a plurality of versions of a protocol that the first computing device can support to use the insights VC to communicate the insights. In some embodiments, the first computing device may establish the insights VC according to a highest of a plurality of versions of a protocol that is supported across the first computing device, the second computing device and the intermediary device to use the insights VC.

In some embodiments, the first computing device may establish a plurality of VCs between the first computing device and the second computing device, separate from the insights VC. The plurality of VCs may be at least one of interleaved with each other or configured to carry compressed data. The insights VC may be at least one of non-interleaved with any of the plurality of VCs, or configured to carry uncompressed data.

In some embodiments, the response message may include information associating an identifier of a protocol for communicating data using the insights VC, with an identifier of the insights VC or a component of the first computing device. In some embodiments, the first computing device may identify or access the insights VC from among a plurality of VCs, using the information.

In some embodiments, the first computing device may access, via the insights VC, insights from at least one of the second computing device or the intermediary device. In some embodiments, the insights from the intermediary device may include analytics about a network of the intermediary device.

At least one aspect of the present disclosure is directed to systems, methods, and non-transitory computer readable media for state transition of app flow metrics during network appliance failover. A first device may be intermediary between a first computing device and a second computing device. The first device may determine that an insights virtual channel (VC) established between the first computing device and the second computing device, is re-routed to the first device from a second device intermediary between the first computing device and the second computing device. The first device may receive protocol state of the insights VC. The protocol state may include information associating (i) an identifier of a protocol for communicating insights using the insights VC, with (ii) an identifier of the insights VC or a component of the first computing device. The first device may access, using the received protocol state, the insights communicated via the insights VC, that are from at least one of the first computing device or the second computing device.

In some embodiments, the first device may receive the protocol state of the insights VC from a shared storage. The protocol state may be saved by the second device in the shared storage. In some embodiments, the protocol state of the insights VC may include capabilities negotiated across the first computing device, the second computing device and the second device, to support communicating the insights via the insights VC. In some embodiments, the protocol state of the insights VC may include at least one of a protocol name of the insights VC, information about event of the insights VC, and data points of the insights VC.

In some embodiments, the device may receive the protocol state of the insights VC by identifying the protocol state using a protocol-level identifier. In some embodiments, the device may receive the protocol state of the insights VC by accessing the identified protocol state from the shared storage. In some embodiments, the protocol state of the insights VC may include at least one of an encryption method, an encryption key, or a last encrypted byte.

In some embodiments, the first device may re-synchronize, at a common gateway protocol level, packets transmitted or received via the insights VC. In some embodiments, the first device may initialize or re-initialize using a tunneling protocol. In some embodiments, the first device may receive the protocol state of the insights VC from a VC agent executing at the first computing device or the second computing device. In some embodiments, the protocol state of the insights VC may include capabilities negotiated across the first computing device, the second computing device and the second device, to support communicating the insights via the insights VC.

At least one aspect of the present disclosure is directed to systems, methods, and non-transitory computer readable media for identification and prioritization of Multi-stream ICA (MSI) HDX streams. A first device may establish a plurality of data streams between the first device and a second device. Each of the data streams may include at least one virtual channel (VC), wherein a first data stream of the plurality of data streams includes an insights VC. The first device may determine, for each corresponding data stream of the plurality of data streams, an identifier and a priority of the corresponding data stream. The first device may send, for each corresponding data stream of the plurality of data streams, information regarding the identifier and the priority of the corresponding data stream, in the corresponding data stream, to be accessed by a computing device intermediary between the first device and the second device.

In some embodiments, the first device may send, in the corresponding data stream, the information including a globally unique identifier of a session of the plurality of data streams. In some embodiments, the first device may send, in the corresponding data stream, the information including a type of the corresponding data stream. In some embodiments, the type of the corresponding data stream may correspond to a primary data stream or a secondary data stream.

In some embodiments, the first device may determine, for each corresponding data stream of the plurality of data streams, an updated priority of the corresponding data stream. In some embodiments, the first device may send, for each corresponding data stream of the plurality of data streams, information regarding the identifier and the updated priority of the corresponding data stream, in the corresponding data stream.

In some embodiments, the first device may communicate data in the plurality of data streams via a single port to server or a client device. In some embodiments, the first device may send the information responsive to establishing one of the plurality of data streams.

At least one aspect of the present disclosure is directed to systems, methods, and non-transitory computer readable media for application layer (L7) calculation and communication independent of server host processing time. A device intermediary between a client device and a server may incorporate a token to a first packet at a time T1. The device may cause the server to receive the token in the first packet at a time T2, and to determine a duration D for generating a payload relative to T2. The device may receive a second packet with the payload at a time T3. The device may determine a round-trip network time according to T3−T1−D.

In some embodiments, the device may receive the first packet from the client device. In some embodiments, the device may record the time T1. In some embodiments, the device may cause a driver of the server to receive the token in the first packet at the time T2. In some embodiments, the device may cause an application of the server to generate the payload responsive to the first packet. In some embodiments, the device may cause the driver of the server to receive the payload at a time T2a, wherein D=T2a−T2.

In some embodiments, the payload may be in Javascript object notation (JSON) format. In some embodiments, the device may receive the second packet in an insights virtual channel (VC) established between the client device and the server. In some embodiments, the insights VC may be non-interleaved with other VCs established between the client device and the server, and the payload in the second packet comprises uncompressed data.

In some embodiments, the device may incorporate an identification of the device in the first packet. In some embodiments, the device may determine the round-trip network time if the second packet includes the identification of the device. In some embodiments, the device may receive a third packet from the server. In some embodiments, the device may bypass a determination of the round-trip network time according to the third packet, if the identification of the device is absent in the third packet.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 8:
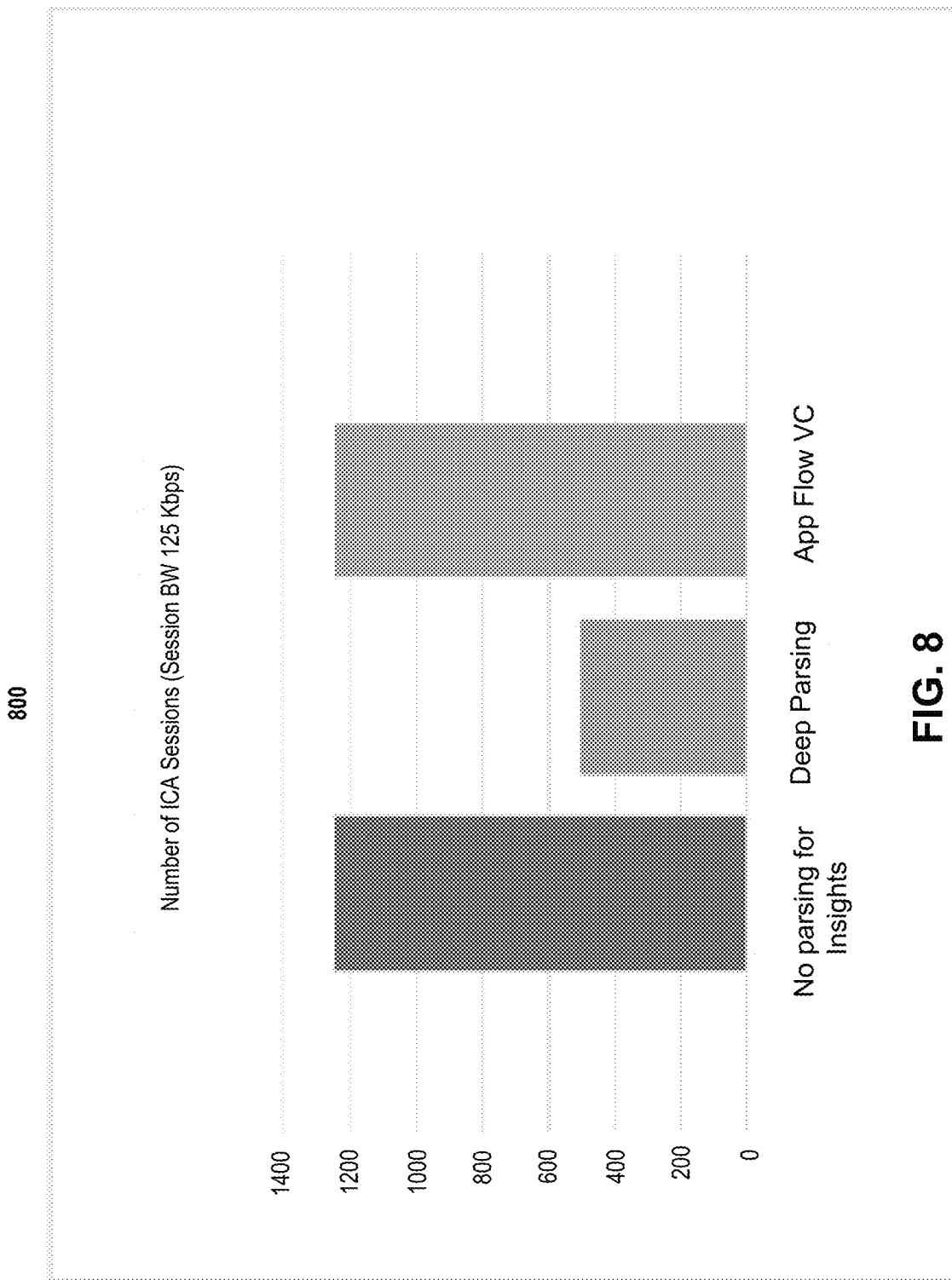
Figure 9:
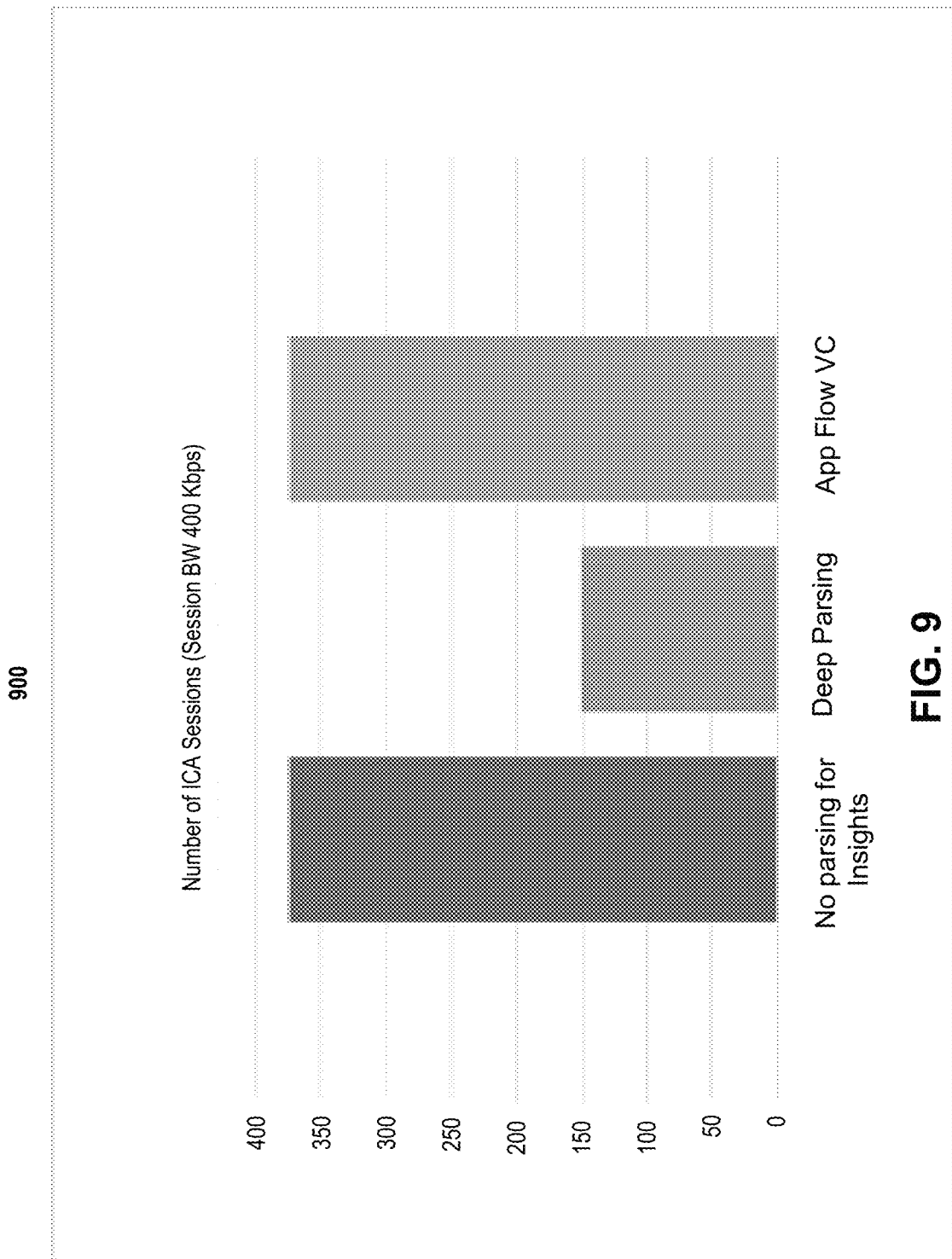
Figure 10:
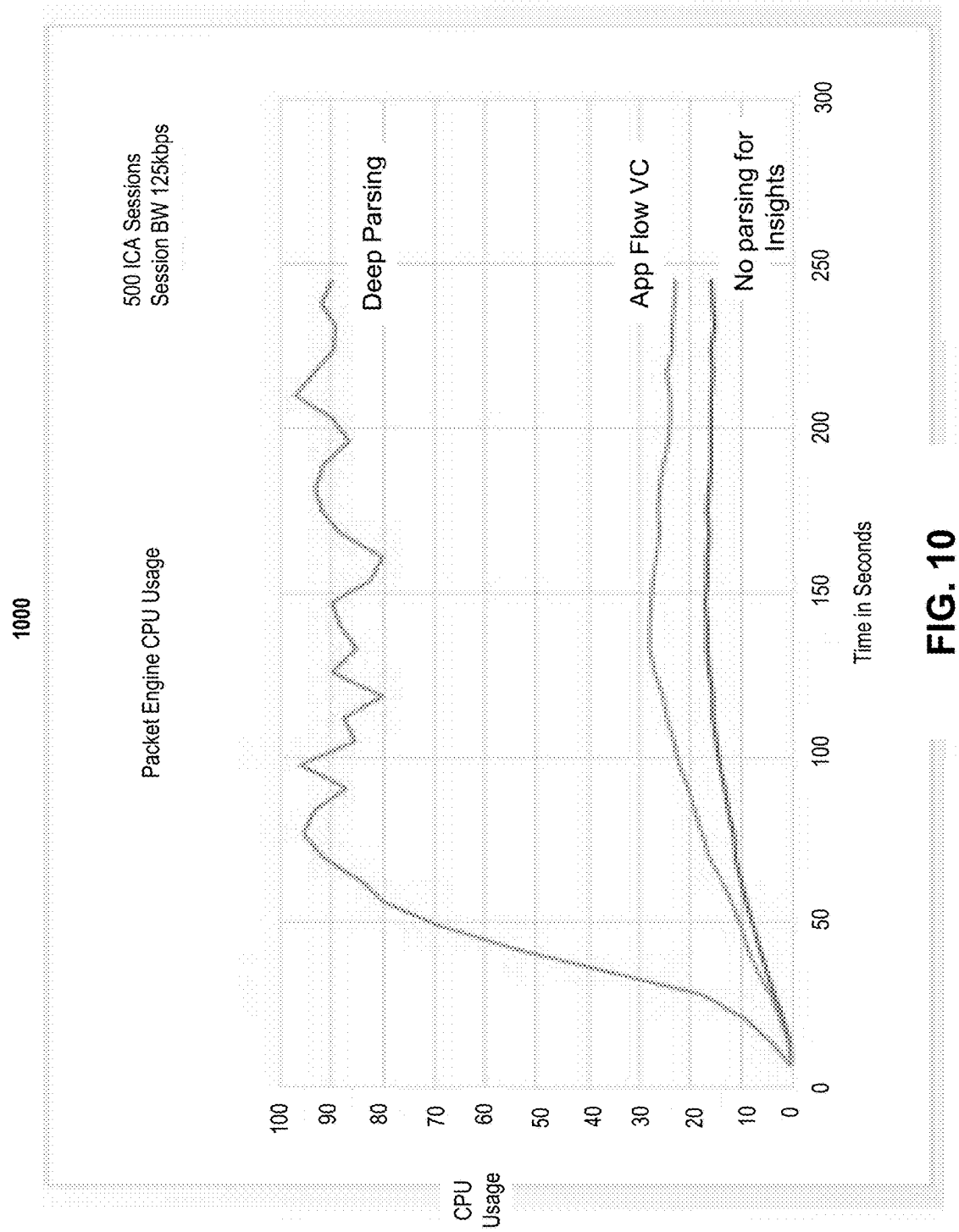
Figure 11:
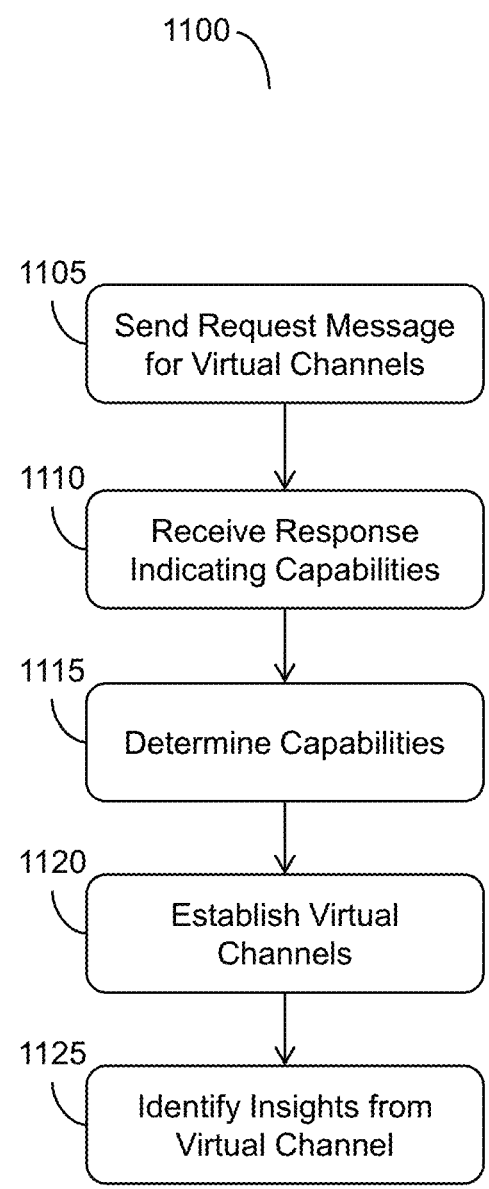
Figure 12:
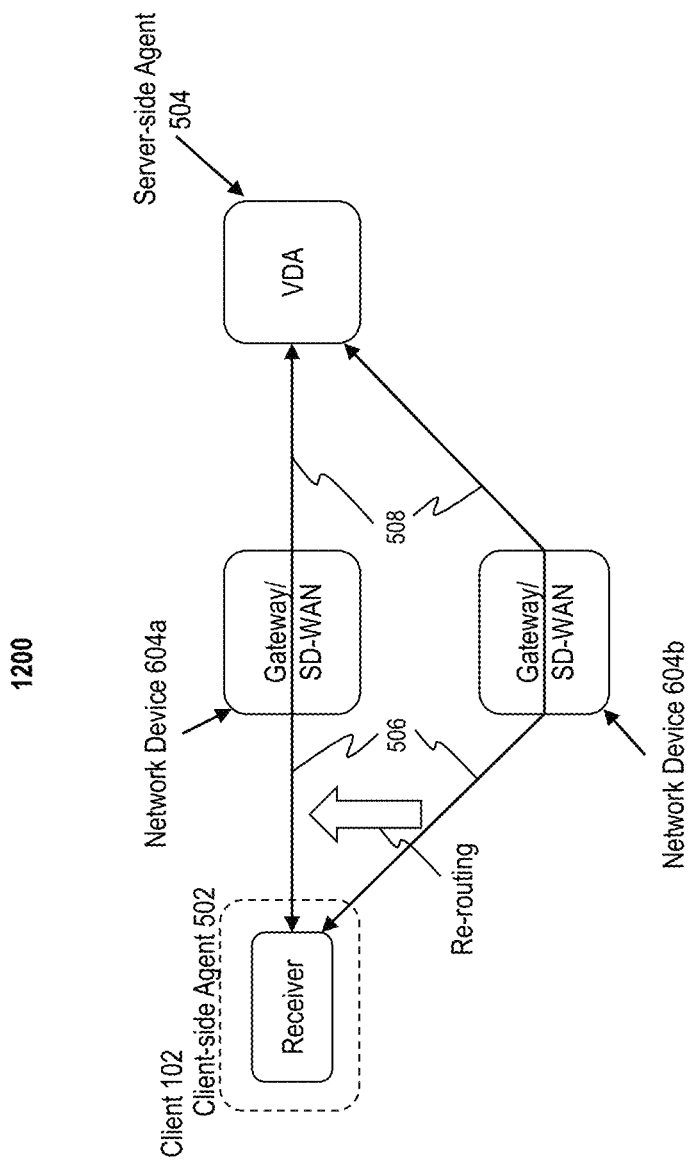
Figure 13:
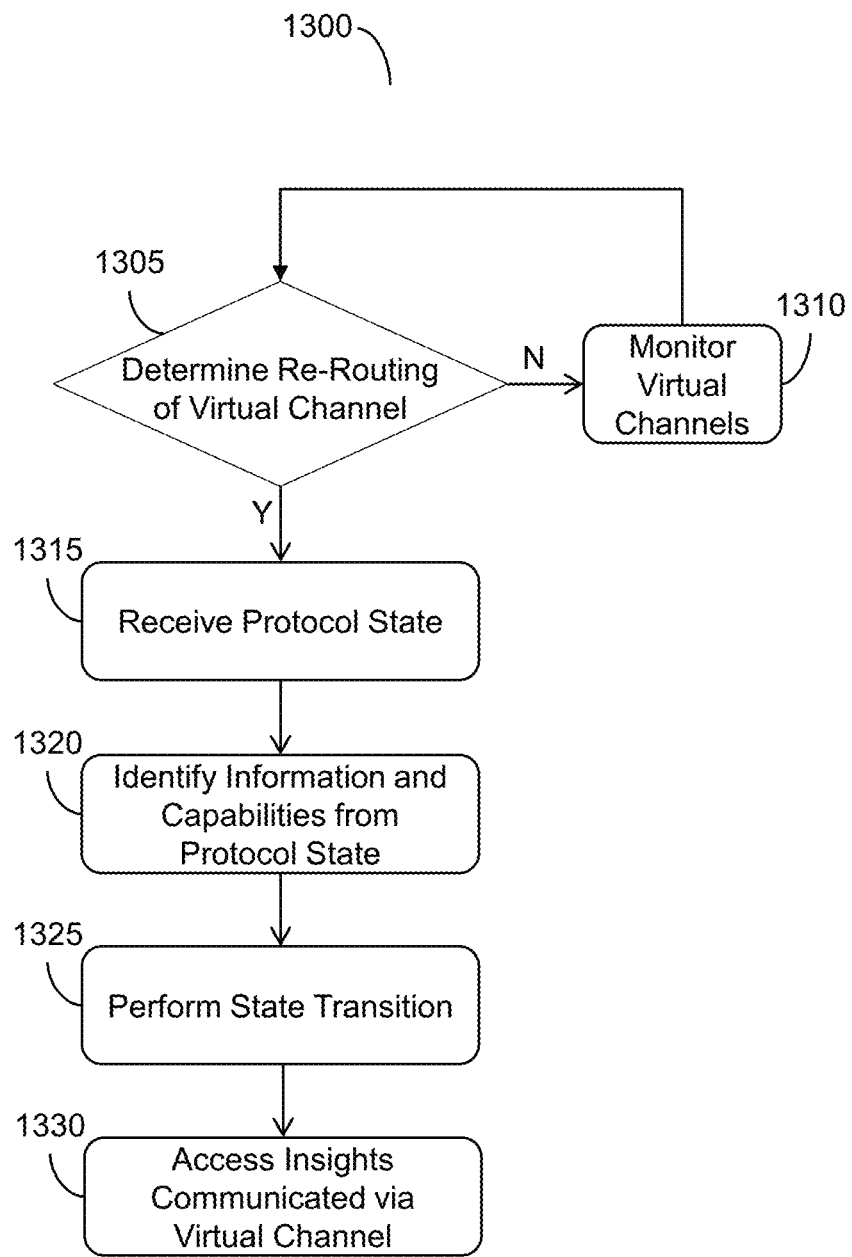
Figure 14:
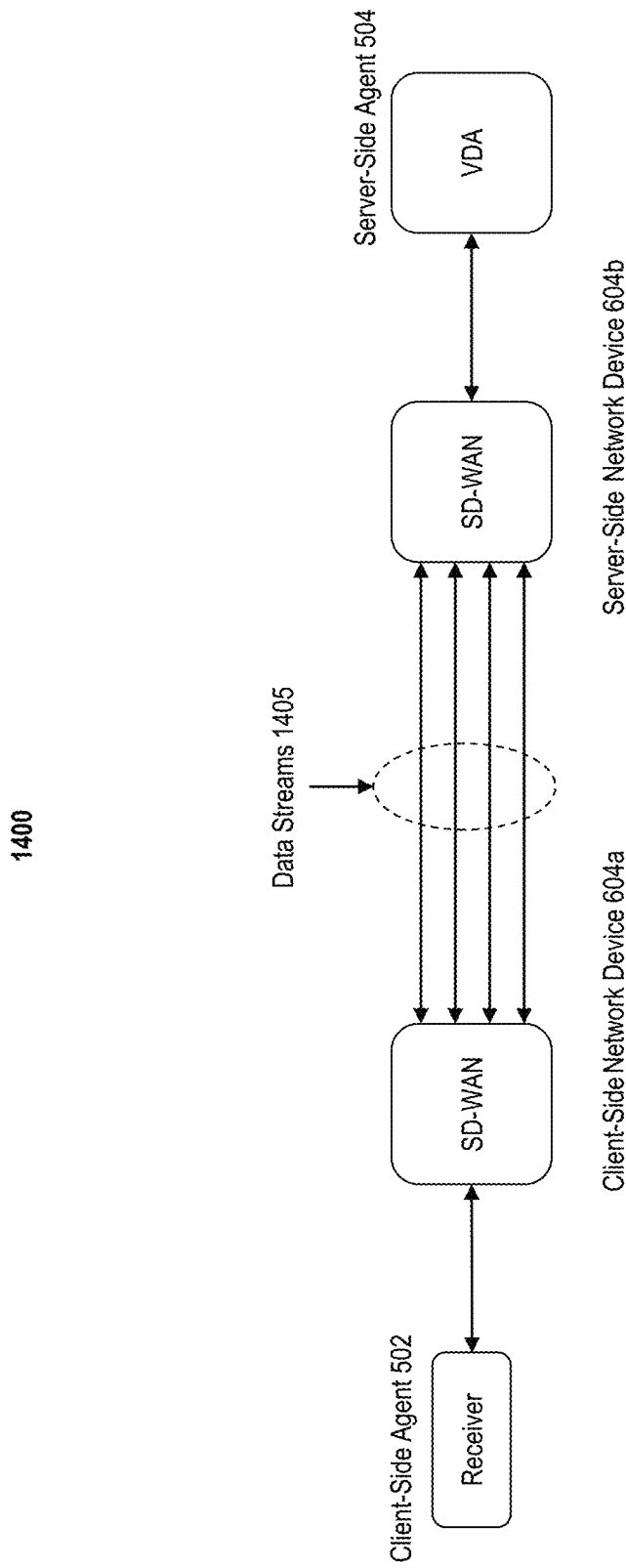
Figure 15:
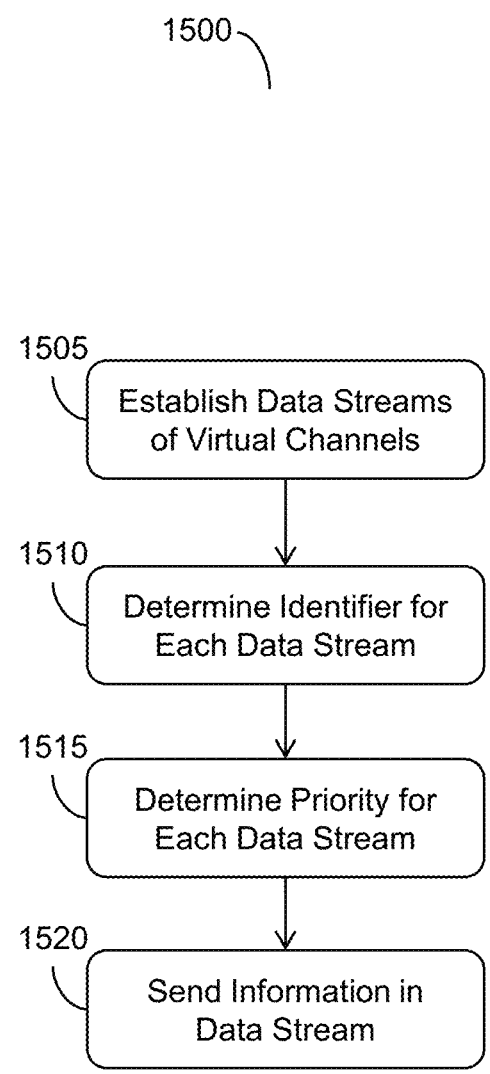
Figure 16:
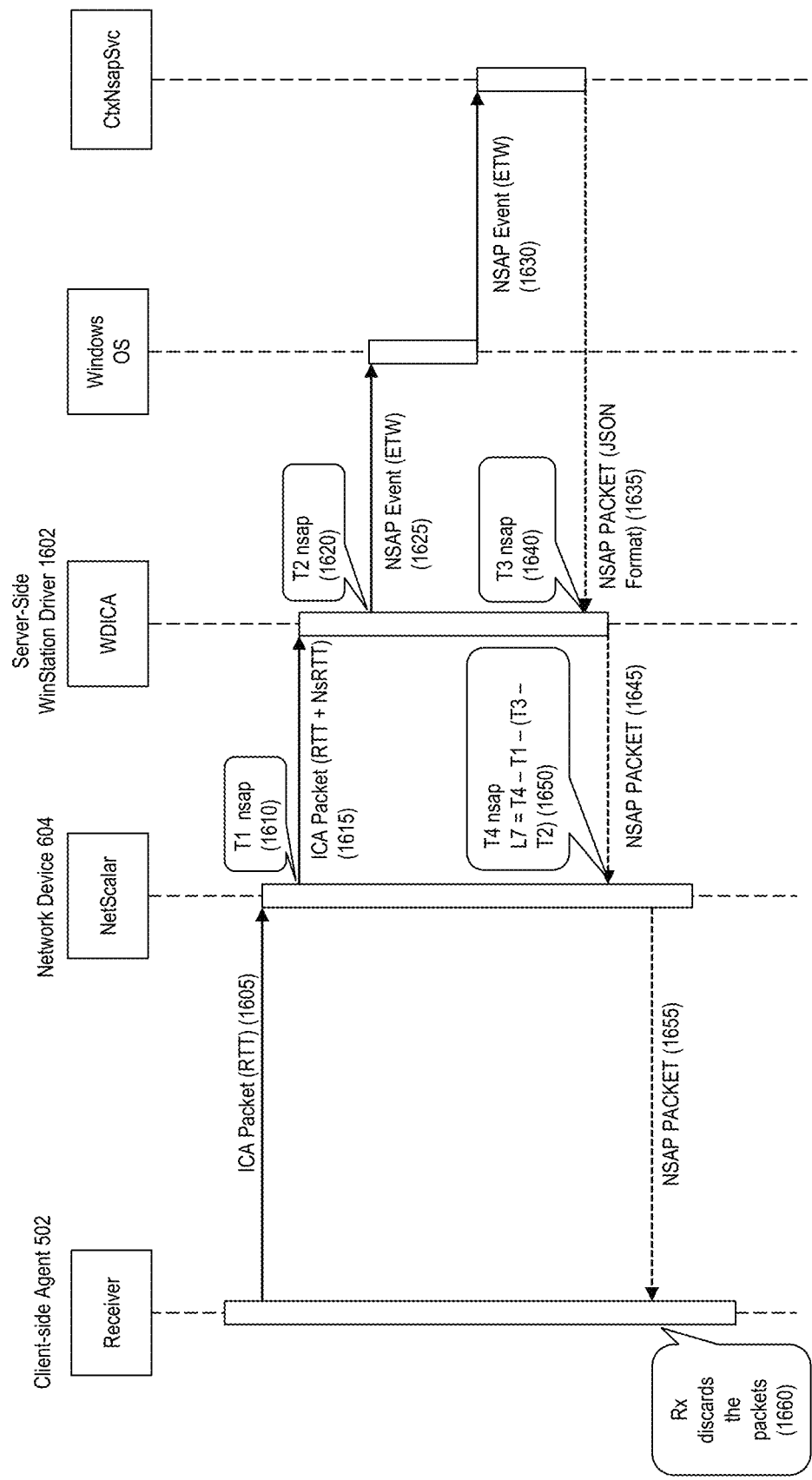
Figure 17:
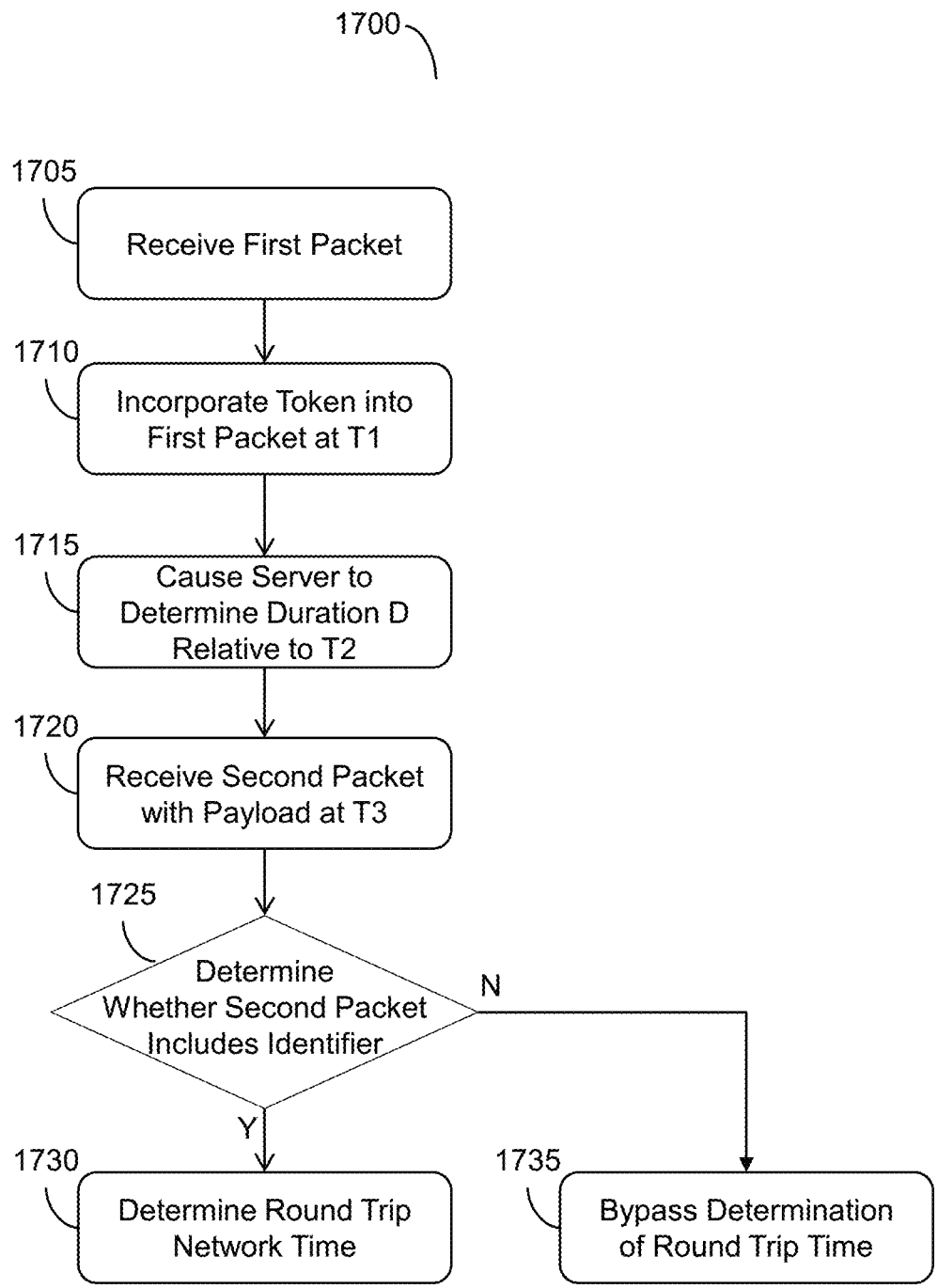

FIGS. 8-10 provide example charts comprising test results comparing implementations with and without using an App Flow virtual channel for insights, according to an illustrative embodiment;

FIG. 11 is a flow diagram of a method of establishing independent application flow virtual channels, according to illustrative embodiments;

FIG. 12 is a block diagram of a system of transitioning application flow metrics during appliance failover, according to illustrative embodiments;

FIG. 13 is a flow diagram of a method of transitioning application flow metrics during appliance failover, according to illustrative embodiments;

FIG. 14 is a block diagram of an embodiment of a system for providing multi-stream ICA (MSI) between client-side and server-side network devices, according to illustrative embodiments;

FIG. 15 is a flow diagram of a method of prioritizing data streams for virtual channels, according to illustrative embodiments;

FIG. 16 is a diagram illustrating a method for calculating latency independent of server processing time, according to illustrative embodiments; and FIG. 17 is a flow diagram of a method of calculating latency in application layer (L7) communications independent of host server processing time, according to illustrative embodiments.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods of providing or using a virtual channel to provide insights.

A. Network and Computing Environment

Figure 1A:
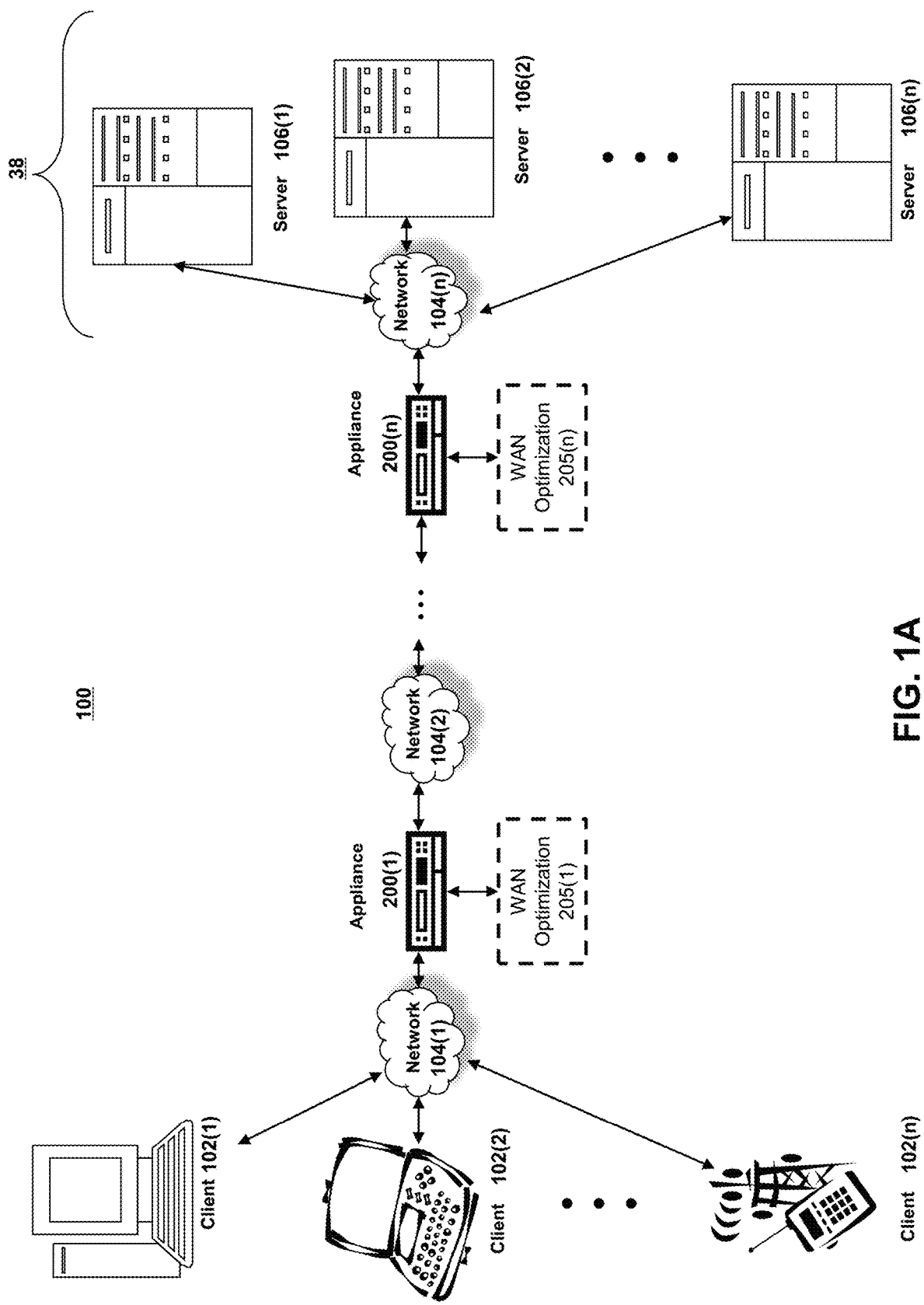
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
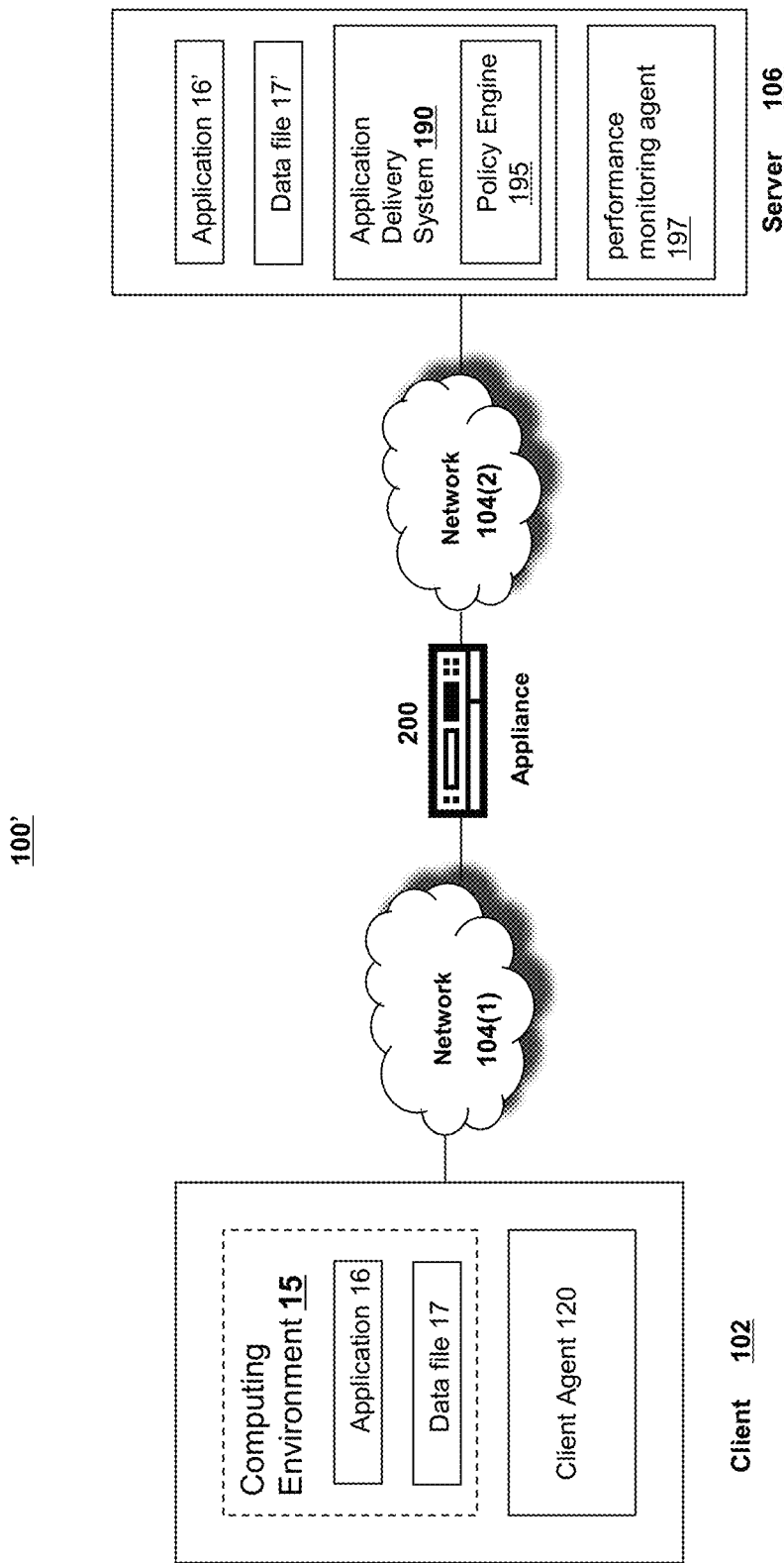
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
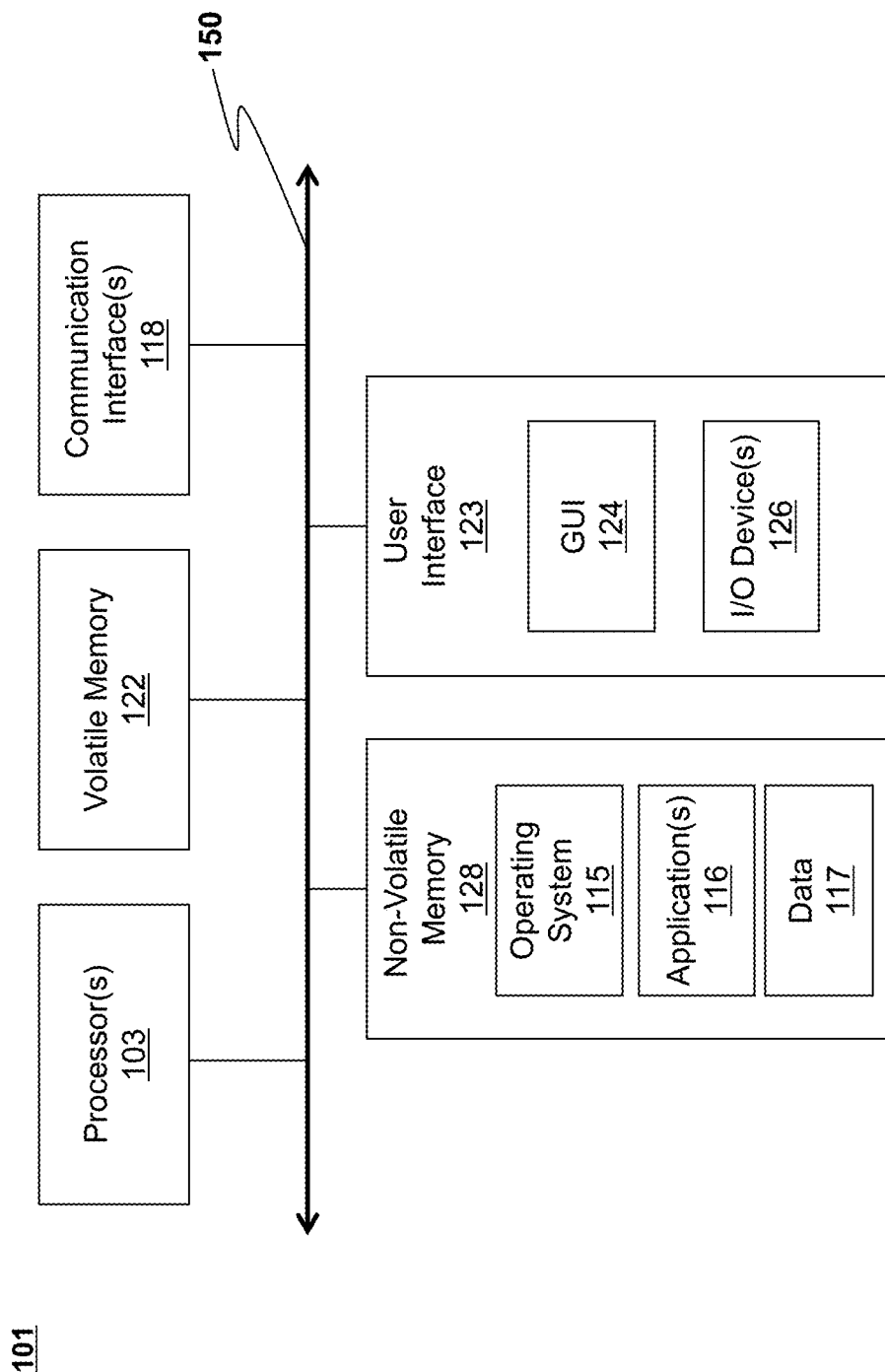
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
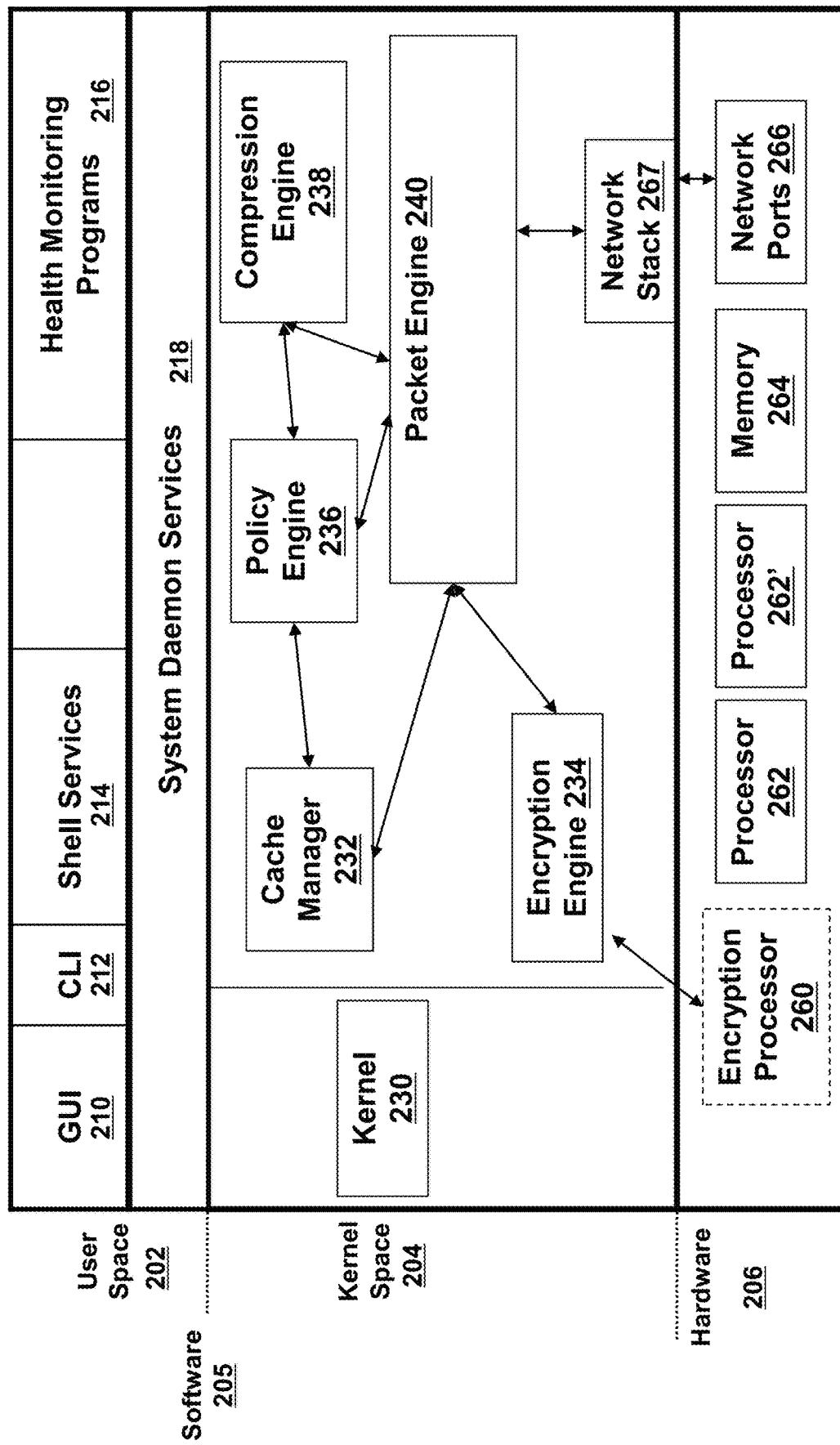
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
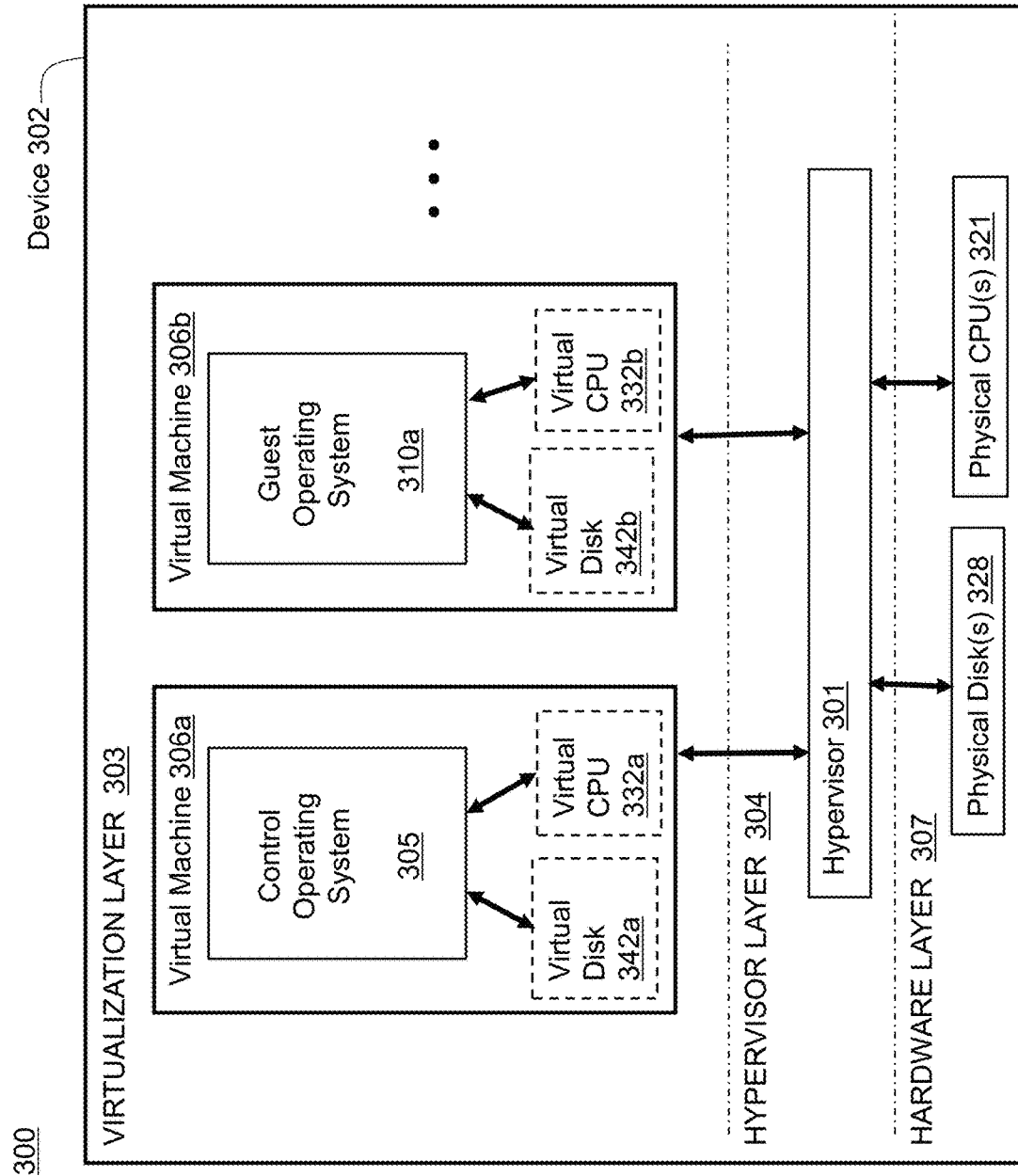
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hash values from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
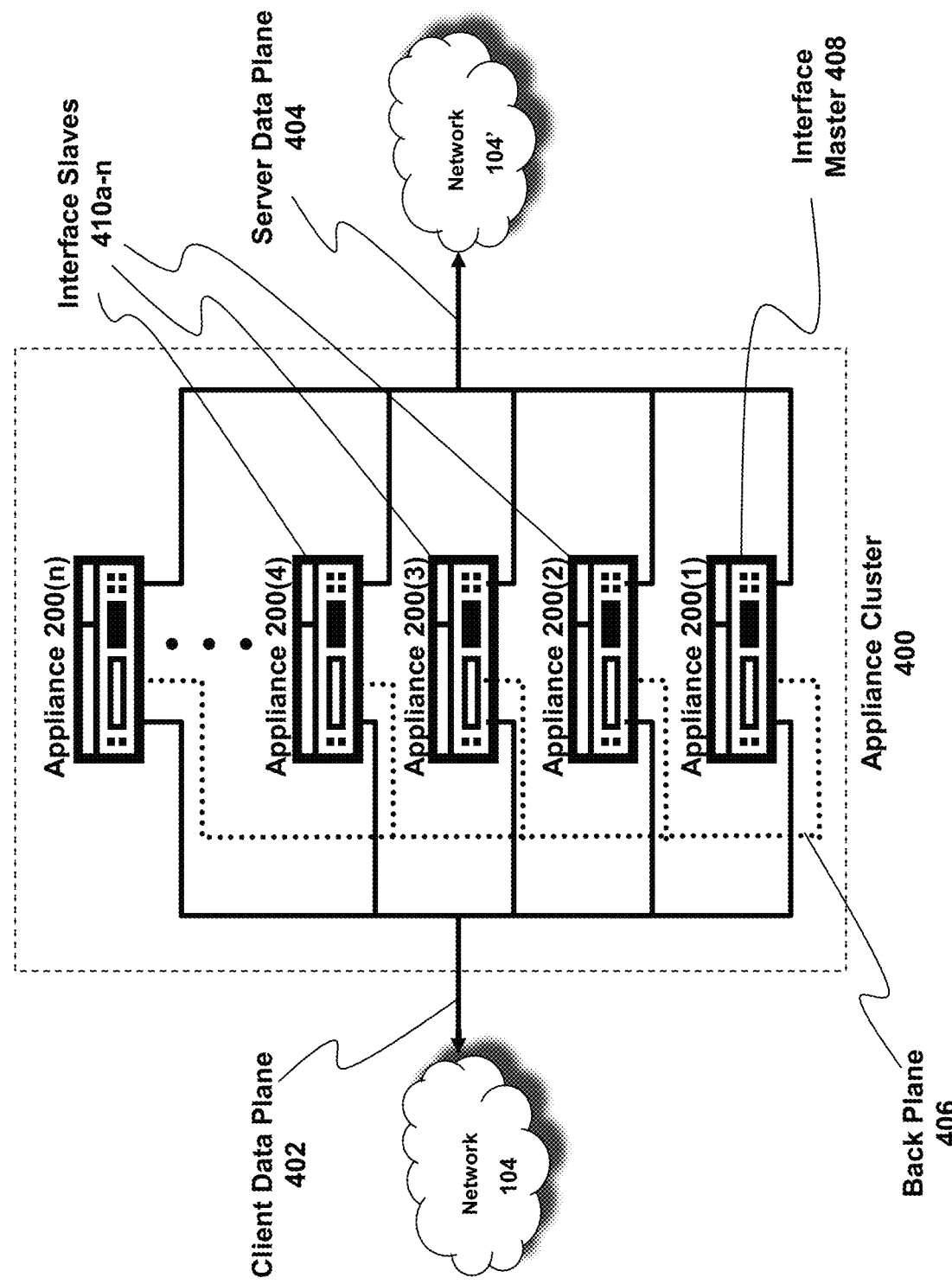
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similar to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

E. Systems and Methods for Providing and Using a Virtual Channel to Provide Insights Described herein are systems and methods for providing insights or metrics in connection with provisioning applications and/or desktop sessions to end-users. Network devices (e.g., appliances, intermediary devices, gateways, proxy devices or middle-boxes) such as Citrix Gateway and Citrix software-defined wide area network (SD-WAN) devices can gather insights such as network-level statistics. Additional insights (e.g., metadata and metrics) associated with virtual applications and virtual desktops can be gathered to provide administrators with comprehensive end-to-end real-time and/or historical reports of performance and end-user experience (UX) insights. In some embodiments, to obtain the insights, the network devices may have to perform deep parsing of virtualization and other protocols such as Citrix independent computing architecture (ICA), remote desktop protocol (RDP), or Citrix high definition experience (HDX), along with some or all associated virtual channels (VCs).

This deep parsing can demand or entail knowledge of all underlying protocol details, and can be resource intensive. The effort for a network device to deeply parse, decrypt and/or decompress traffic (e.g., HDX traffic) can hurt the scalability of the network device and can significantly increase the cost of supporting (e.g., HDX specific) insights. These can be memory and CPU intensive operations that directly affect the number of connections (e.g., ICA connections) that a network device (e.g., Citrix Gateway or SD-WAN appliance) can support at a time. Deep parsing of such traffic can be a memory and CPU intensive operation, mainly because of the stateful decompression of the ICA stream. "Stateful" can refer to maintaining, tracking, keeping, storing and/or transitioning of state(s) across connections, sessions, time and/or operations, for example.

To address these and other challenges, the present disclosure provides embodiments of methods and systems for delivering insights of a virtual session to a network device in a real-time, scalable and/or extensible manner (e.g., without deep parsing by a network device). In some embodiments, a separate or independent VC (sometimes referred to as an App Flow VC) can be established across or between a client-side agent (e.g., desktop virtualization client), network device(s) and a server-side agent (e.g., VDA) for the transmission of insights (e.g., virtualization session insights). The App Flow VC can be negotiated between these entities (e.g., between the desktop virtualization client, network appliances and VDA). The App Flow VC can facilitate scalable and extensible processing of insights. The App Flow VC can remain non-interleaved with other VCs in a HDX/ICA stream, and the stream can be uncompressed to facilitate access to and parsing of the App Flow VC. Such simple parsing consumes significantly lower levels of resources, and improves the operation of the network device by allowing more resources of the network device to perform any other functions, such as to process a larger number of connections (e.g., ICA connections) at a given time. Even if a larger number of connections is not necessary, lower consumption of CPU resources for instance results in lower power consumption (e.g., lower energy wastage to obtain similar insights) and/or heat generation, as compared with deep parsing. Hence, the present system and methods allow for substantive improvements in the operation of system components such as network devices (e.g., SD-WAN and gateway devices).

Further, embodiments of the present methods and system can improve the HDX/ICA platform in addition ways. For example, embodiments of the present methods and system can provide or support state transition of App Flow insights or metrics during network device failover (e.g., high-availability failover), hence improving operation during such failover. Certain embodiments of the present methods and system provide or support efficient identification and prioritization of Multi-stream ICA (MSI) HDX streams, which reduces resources to access and process data from such streams. Some embodiments of the present methods and system provide or support layer 7 (L7, application layer) latency calculation and communication independent of server processing time. Some embodiments of the present methods and system provide or support L7 latency calculation and communication between multiple network devices. Hence, these solutions can provide metrics that more accurately characterizes the health and performance of specific network components, segments or connections.

Figure 5:
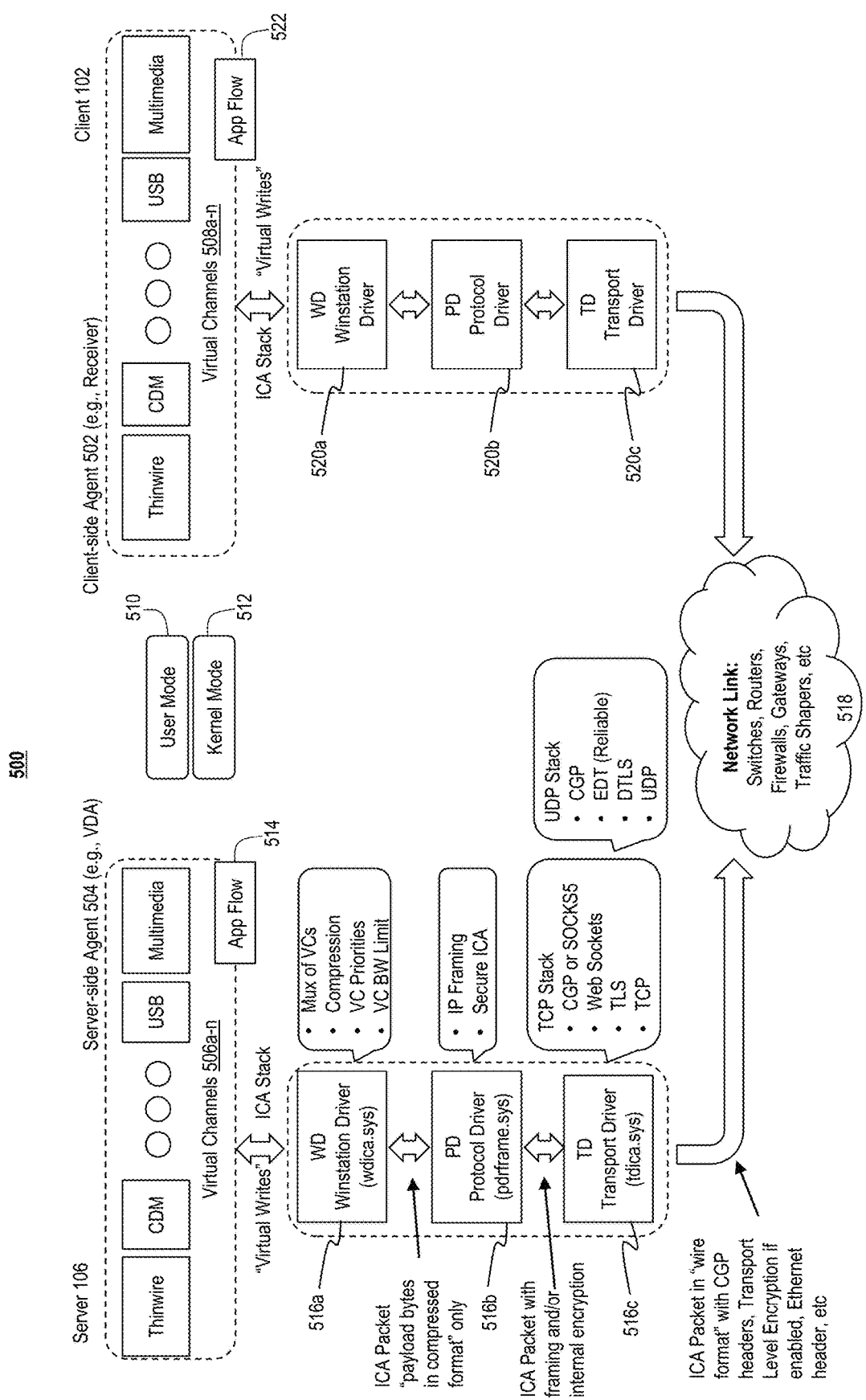
FIG. 5 is a block diagram of an embodiment of a system for providing or using a virtual channel to provide insights, according to an illustrative embodiment.

In an ICA or HDX configuration for instance, VCs can support a remote computing experience at a client 102, by providing access to one or more applications and/or remote desktops hosted on a server 106. As shown in FIG. 5, VCs can be established using a server-side agent 504 and a client-side agent 502. As illustrated in FIG. 5, the system 500 can include a client 102 with a client-side agent 502 (e.g., Workspace App), a server 106 with a server-side agent 504 (e.g., VDA), ICA stacks on each of the client 102 and the server 106, that supports the HDX session via a network link. Each of the ICA stacks 516a-n can include a WinStation driver (WD) 516a, a protocol driver (PD) 516b, and/or a transport driver (TD) 516c, each involving one or more corresponding protocols.

VCs can support communications and functionalities between the client 102 and the server 106, in provisioning an application or desktop via remote delivery to the client 102. Virtual channels can provide a secure way for an application running on the server 106 to communicate with the client 102 or the client-side environment. Each virtual channel can support communications for supporting or enabling one or more functionalities of the application or desktop, such as graphics, disks, COM ports, LPT ports, printers, audio, video, smart card, and so on, so that these functionalities are available across the client 102 and the server 106. Some virtual channels can be loaded or established in user mode 510, and some others can be loaded or established in kernel mode 512. Virtual channels established in the user mode 510 may have limited access to the functionalities of the client 102 or the server 106 (e.g., those allocated to the application for the virtual channel). Conversely, virtual channels established in the kernel mode 512 may have full or more expansive access to the functionalities of the client 102 or the server 106 (e.g., besides those allocated to the application). A client virtual channel, for example, can be routed through a WinStation driver 520a (e.g., in the server-side ICA stack 520a-n), and can be polled or accessed on the client-side by a corresponding WinStation driver 516a (e.g., in the client-side ICA stack 516a-n). On the client side, virtual channels can correspond to virtual drivers each providing a specific function. The virtual drivers can operate at the presentation layer protocol level for instance (or another protocol level). There can be a number of these protocols active at any given time by multiplexing channels that are provided by for instance the WinStation protocol layer (or WinStation driver). Multiple virtual channels can be combined or multiplexed within a provisioning session (e.g., an ICA/HDX session or traffic stream).

Virtual channels can be created by virtualizing one or more "physical" channels, each virtualized into one or more virtual channels. For example, several virtual channels may be identified separately and can carry different types of communications, but may share the same port corresponding to a physical channel. The use of virtual channels can allow sharing or data multiplexing on a single non-virtual channel to support multiple streams of information. One or more virtual channels may operate to communicate presentation layer elements from the server 106 to the client device 102. Some of these virtual channels may communicate commands, function calls or other messages from the client device 102 to an application or a remote desktop's operating system. These messages may be used to control, update or manage the operation and display of the application or desktop.

By way of example, a client-side agent 502 may receive, from a server-side agent 504 via a provisioning (e.g., ICA, RDP, HDX) session, data associated with a remote desktop environment generated on a server 106 (e.g., a Citrix Virtual Desktops server). In some embodiments, the client-side agent 502 may be provided as a dynamically linked library component for example, that receives window creation and window process data from the server-side agent 504 for use in displaying a local version of a window generated on the server 106. In some embodiments, the client-side agent 502 may receive data such as window attribute data over one or more connections. The one or more connections may be multiplexed into one or more virtual channels. Such multiplexing may allow for different virtual channels to have different bandwidth limits or different priorities, while still being part of a single transport layer connection. This can reduce the transport layer overhead required and provide for SSL or VPN tunnel capability, while still allowing per-channel compression, buffering, and/or management of communication priority between the client-side agent 502 and the server-side agent 504. The virtual channels may be dedicated to specific content types or purposes. For example, a first high-priority virtual channel may be dedicated to transmission of application output data, while a second low-priority virtual channel may be dedicated to transmission of taskbar thumbnail images. A plurality of virtual channels can be used for communicating one or more types of application data (e.g., audio, graphics, metadata, printer data, disk data, smart card data, and so on). For instance, some types of application data can each be conveyed or communication via a dedicated virtual channel within the provisioning session, and/or certain types of application data can each be conveyed or communication to the intermediary device by sharing one or more virtual channels.

In a HDX session for delivering an application or desktop (e.g., via Citrix Virtual Apps and Desktops), the protocol exchange between a client-side agent (e.g., Citrix Workspace App) and a server-side agent (e.g., Citrix Virtual Apps and Desktops virtual delivery agent (VDA)) can involve multiple protocols including a core ICA protocol, and protocols for VCs representing various technologies, such as graphics, multimedia, printing, drive mapping, windowing, user input, etc. Deep parsing (e.g., decompression, decoding, decryption and/or de-interleaving) of such virtualization protocols and/or VC data streams can consume significant processing resources and greatly limit the scalability of network devices. For instance, network devices (e.g., Citrix Gateway and SD-WAN) can deeply parse ICA traffic flowing through a network, having one or more protocols such as transmission control protocol (TCP) or transport layer security (TLS), enlightened data transport (EDT) or datagram transport layer security (DTLS) or user datagram protocol (UDP), common gateway protocol (CGP), ICA framing, custom ICA encryption (e.g. secure ICA), ICA protocol itself (e.g., including compression, such as stateful context-based compression) and de-interleaving of individual core ICA or VC data streams, and the individual VC protocols in order to gather various information or insights from a HDX session for instance.

In addition to HDX, RDP or ICA based sessions, other types of communications sessions are contemplated that can include various channels or connections of data streams (e.g., with features similar to virtual channels), and may involve various corresponding protocols. Insights, metrics, analytics, statistics and/or other information (hereafter sometimes generally referred to as insights) relating to the communication session can be used to determine and/or improve user experience and the overall health of the infrastructure of the communications session (e.g., Citrix Virtual Apps and Desktops infrastructure), and the applications (e.g., Microsoft Office applications, remote desktop application) being delivered using the infrastructure. The insights can be combined with other network-health analysis performed by network devices, and/or processed and/or used by the network devices (e.g. Citrix Gateway or Citrix SD-WAN), to for instance adapt or improve certain operation(s). In addition, such collective insights may be provided to a management and triaging utility (e.g. Citrix Director), a management analytics service, or a third-party collector tool. The collective insights and/or these tools can allow administrators to view and analyze real-time client, host and network latency metrics, historical reports and/or end-to-end performance data, and can allow the administrators to troubleshoot performance and network issues.

However, the effort for a network device to deeply parse, decrypt and/or decompress traffic (e.g., HDX traffic) can hurt or limit the scalability of the network device and can significantly increase the cost of supporting (e.g., HDX specific) insights. These can be memory and CPU intensive operations that directly affect the number of connections (e.g., ICA connections) that a network device (e.g., Citrix Gateway or SD-WAN appliance) can support at a time. Deep parsing of such traffic can be a memory and CPU intensive operation, mainly because of the stateful decompression of the ICA stream. "Stateful" can refer to maintaining, tracking, keeping, storing and/or transitioning of state(s) across connections, sessions, time and/or operations, for example.

In some embodiments, adding additional insights for retrieval by a network device may entail updating one or more of the session protocols (e.g., the HDX protocols). Parsing multi-stream ICA (MSI) streams can further complicate the network device's parsing mechanism, logic and/or methods. High-availability (HA) failovers from one network device to another can also be complicated by the process or requirement of transitioning very large and complex state between the devices in order to continue gathering insights. High-availability, for instance, can refer to a system being tolerant to failure, such as using hardware redundancy. In some embodiments, measuring the roundtrip latency between client-side and server-side agents (e.g., Citrix Workspace App and VDA) can be affected by server load and server processing time.

To address these and other challenges, the present disclosure provides embodiments of methods and systems for delivering insights of a virtual session to a network device in a real-time, scalable and/or extensible manner (e.g., without deep parsing by a network device). In some embodiments, a separate or independent VC (sometimes referred to as an App Flow VC) can be established across or between a client-side agent (e.g., desktop virtualization client), network device(s) and a server-side agent (e.g., VDA) for the transmission of insights (e.g., virtualization session insights). The App Flow VC can be negotiated between these entities (e.g., between the desktop virtualization client, network appliances and VDA). The App Flow VC can facilitate scalable and extensible processing of insights.

Some embodiments of the present methods and systems provide or support state transition of App Flow insights or metrics during network device failover (e.g., high-availability failover). Certain embodiments of the present methods and systems provide or support efficient identification and prioritization of MSI HDX streams. Some embodiments of the present methods and systems provide or support layer 7 (e.g., L7, application layer) latency calculation and communication independent of host processing time. Some embodiments of the present methods and systems provide or support L7 latency calculation and communication between multiple network devices.

Referring again to FIG. 5, the system 500 can incorporate an App Flow VC (e.g., virtual channel 514 or 522) for providing insights, according to an illustrative embodiment. The App Flow VC can incorporate one or more features of the VCs discussed above. In some aspects, the App Flow VC can be identical or similar to other VCs except that the App Flow VC is configured to carry a different type of data stream than that carried by the other VCs. The network link 518, which can include the client 102, server 106 and the ICA stacks, can communicate a data stream of the App Flow VC. The data stream can carry insights (e.g., in packets, frames or other messages) that can be accessed by device(s) in the network link 518.

The systems and methods of the present disclosure may be implemented using or involving any type and form of device, including clients, servers and/or appliances 200 described above with reference to FIG. 1A-FIG. 1B, FIG. 2 and FIG. 4. As referenced herein, a "server" may sometimes refer to any device in a client-server relationship, e.g., an appliance 200 in a handshake with a client device 102. The server 106 may be an instance, implementation, or include aspects similar to server 106a-n described above with reference to at least FIG. 1A. Similarly, the client 102 may be an instance, implementation, or include aspects similar to any of the clients 102 a-n described above with reference to FIG. 1A. The present systems and methods may be implemented using or involving an intermediary device or gateway, such as any embodiments or aspects of the appliance or devices 200 described herein. The systems and methods may be implemented in any type and form of environment, including multi-core devices, virtualized environments and/or clustered environments as described herein.

The server 106 may host one or more applications or services. Each of the applications or services can include or correspond to any type or form of application or service. The application or service may include a network application, a web application, a Software-as-a-Service (SaaS) application, a remote-hosted application, and so on. As some non-limiting examples, an application can include a word processing, spreadsheet or other application from a suite of applications (e.g., Microsoft Office360, or Google docs), an application hosted and executing on a server for remote provisioning to a client, a desktop application, and/or a HTML5-based application. Packets corresponding to an application or service 510 may be compressed, encrypted and/or otherwise processed by the VDA and/or ICA stack (sometimes referred to as HDX stack, or VDA HDX stack) of the server 106, and transmitted or delivered to the client 102. The VDA may include the ICA stack 520a-n (e.g., WD 520a, PD 520b, and TD 520c), and can terminate one end of a VC at the server-side agent 504, with the client-side agent 502 terminating the other end of the VC.

In some embodiments, the client 102 may reside at a branch office or an organization for instance, and may operate within a client-side network, which may include or correspond to a private network (e.g., a local area network (LAN) or wide area network (WAN)). In some embodiments, the server 106 and the client 102 may be communicably coupled to one another via a private network (e.g., a LAN or a software-defined wide area network (SD-WAN)). The server 106 may reside at a server or data center, and may operate within a server-side network, which may also be a private network (e.g., a LAN, WAN, etc.).

One or more network devices can be intermediary between the client 102 and the server 106. A network device 508 can include or correspond to any type or form of intermediary device, network device or appliance, gateway device, middle box device and/or proxy device, such as but not limited to a NetScaler device, SD-WAN device, and so on. Each of the server 106, client 102, and network device(s) in the network link 518 may be communicably coupled in series.

Negotiation and Establishment of an App Flow VC for Transmission of Insights

The server-side agent 504 (e.g., VDA) executing on the server 106 may initiate establishment of an App Flow VC. The server-side agent 504 may initiate establishment of an App Flow VC with a client-side agent 502 (e.g., a desktop virtualization client) and/or network device(s) in the path between the server 106 and the client 102. All or some of the server-side agent 504, the client-side agent 502 (e.g., Citrix Workspace App (CWA) or Citrix Receiver), and the network device(s) (e.g., Citrix Gateway, Citrix Gateway Service, Citrix SD-WAN) along the network link can choose to participate in the negotiation of the App Flow VC. These device(s) can advertise their presence and/or capabilities to support the App Flow VC.

For example, the server-side agent's HDX stack can initiate, establish or otherwise enable the App Flow VC, and can send its host-to-client (e.g., server 106 to client 102) insights data on a HDX connection (e.g., using ICA or Common Gateway Protocol (CGP)). The HDX connection may be the same as a HDX connection for carrying one or more other VCs (or HDX VCs), except that the App Flow VC that it carries may be uncompressed and/or non-interleaved with any other HDX VC(s). This is to facilitate efficient parsing of the App Flow VC by network device(s) in the network connection. Any of network device(s) and the client-side agent 502 (e.g., Receiver) may parse and interpret, or simply ignore the insights data in the App Flow VC. Within the App Flow VC, insights data may be sent in a self-descriptive, light-weight extensible format, e.g. in JavaScript Object Notation (JSON) format.

Similarly, the client-side agent's HDX stack may establish or enable the App Flow VC, and send its client-to-host (e.g., client 102 to server 106) insights data via the App Flow VC. The App Flow VC may remain uncompressed and/or non-interleaved with other HDX VCs to facilitate efficient parsing by network device(s). The server-side agent 504 (e.g., VDA) may parse and interpret, or simply ignore the client-to-host insights data in the App Flow VC.

In some embodiments, an App Flow protocol capability or data structure is used to negotiate a configuration (e.g., capabilities) for the App Flow VC, which can include advertising support for the App Flow VC by different entities (e.g., along the network link) to certain entities (e.g., client 102, server 106). The entities can advertise their support for the App Flow VC by performing capabilities exchange between the entities. The entities that are involved in the negotiation can include at least one of the following: (a) server 106 (host), (b) network device A (e.g., gateway), (c) server-side network device B (e.g., SD-WAN device), (d) client-side network device C (e.g., SD-WAN device), or client 102. The capabilities exchange between the entities can determine a behavior of App Flow VC for a particular HDX session. More than one network device (e.g., gateway device, SD-WAN device) may participate in the negotiation. The capabilities exchange can include an entity reporting or advertising an App Flow capability of the entity to one or more entities, or exchanging its App Flow capability with that of one or more other entities.

Figure 6:
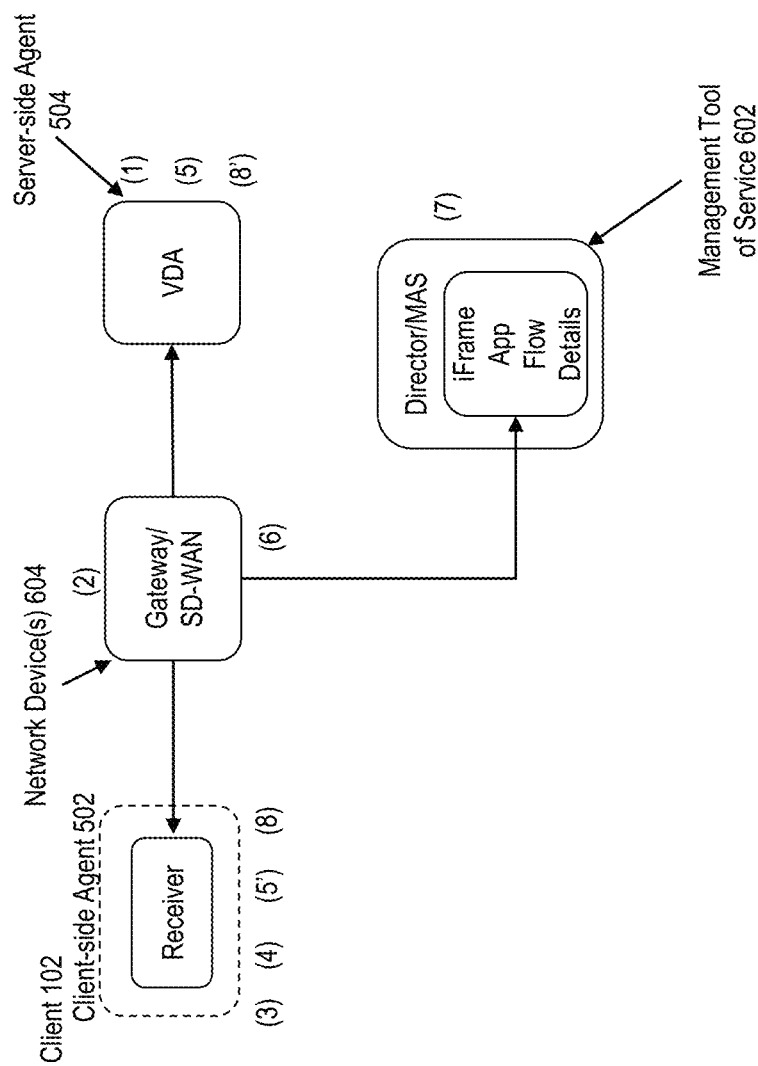
FIG. 6 is a diagram of an embodiment of a system and method for providing or using a virtual channel to provide insights, according to an illustrative embodiment.

In some embodiments, the App Flow VC capability may include at least one of the following information or data fields:

Host (or server) Protocol Version
Host (or server) Flags
Gateway Protocol Version
Gateway Flags
Host (or server) side SD-WAN Protocol Version
Host (or server) side SD-WAN Flags
Client-side SD-WAN Protocol Version
Client-side SD-WAN Flags
Client Protocol Version
Client Flags
Session Protocol Version
Session Protocol Flags Referring to FIG. 6, a method 600 of negotiating for and using an App Flow VC is depicted, in accordance with an illustrative example. Also depicted in FIG. 6 is a client-side agent 502, a server-side agent 504, network device(s) 604, and a management tool or service 602, that interoperate in connection with the method. As illustrated, various embodiments of the method can include all or some of a number of operations 1 through 8'.

Referring to operation 1, the server-side agent 504 (e.g., VDA) may report a new App Flow capability in a message (e.g., init-request message or packet). If the server 106 does not support the App Flow VC feature or if the App Flow VC feature is disabled in the server 106, the App Flow capability of the server-side agent 504 is not sent to the other entities.

Otherwise, the server 106 sends the App Flow capability with the server's protocol version set to the highest version that the server can support. The server may also set additional flags (e.g., including one or more flags listed above) identifying granular App Flow features. In some embodiments, all or some other data fields (e.g., described above) are initially set to zero (e.g., set to 0 by default, or blanked out). The App flow capability may be sent in the message (e.g., an ICA init-request packet) from the server 106 to the client 102.

Referring to operation 2, a network device 604 can set its network device (e.g., gateway or SD-WAN) protocol version in the App Flow capability in the message (e.g., init-request message or packet). Each network device 604 in the server-to-client path (e.g., in the network link) may receive or intercept the message (e.g., init-request packet). The corresponding network device may parse the App Flow capability in turn along the server-to-client path, and set the corresponding network device's respective App Flow protocol version to the highest version it can support. Each network device 604 may also set additional flags (e.g., including one or more flags listed above) identifying granular App Flow features. A protocol version of 0 (e.g., the initial/default value of 0 remains unchanged or is not set by a corresponding network device) may indicate that the corresponding network device is not present in between the server 106 and the client 102 in the network link. If the corresponding network device residing between the server 106 and the client 102 does not support the App Flow protocol or if the App Flow feature is disabled at the corresponding network device, the capability is left unchanged (e.g., the protocol version remains zero). All other data fields in the App Flow capability are left unmodified.

Referring to operation 3, the client-side agent 502 (e.g., Workspace App) may report the capability for the WinStation Driver at the client-side ICA/HDX stack, in the message (e.g., init-response message or packet). If the client 102 does not support the App Flow feature or the feature is disabled at the client 102, the capability is not sent back to the host (e.g., the init-response packet is not transmitted back to the server 106). The capability is also not sent back to the server 106 if there is no network device present between the client 102 and the server 106, and/or there is no server-side agent 504 support for the App Flow VC feature, as indicated by the respective protocol version data fields being zero (e.g., protocol versions of all possible network devices are blanked out or set to zero, and/or protocol version of server 106 is blanked out or set to zero), or lack of App Flow capability being reported by the server 106. Otherwise, the client 102 can send back the App Flow capability to the host, mirroring or maintaining all server and network device data fields that have already been set. The client 102 can set the client's protocol version to the highest version it can support. The client 102 may also set additional flags (e.g., including one or more flags listed above) identifying granular App Flow features. The App Flow capability may be sent in an ICA init-response packet that is transmitted from the client 102 to the server 106.

Referring to operation 4, the client 102 may provide VC-bind information in the message (e.g., in the init-response for the WinStation Driver). The VC-bind information may include App Flow VC in WinStation Driver VC-bind structures. The VC-bind information may include information associating an identifier of a protocol (e.g., protocol name of a VC protocol or ICA protocol) for communicating data using the insights VC, with an identifier of the insights VC or a component (e.g., WinStation Driver or VC module) of the client 102 or server 106. The VC-bind information may include, indicate or identify a protocol name to ID number binding (sometimes referred to as a protocol name to ID number association). The protocol name may refer to or identify the core ICA protocol or a protocol of the App Flow VC. The ID number may identify or refer to at least one of: an associated VC module, the App Flow VC, or the WinStation Driver. The client 102 (e.g., client-side agent 502, or WinStation Driver) may provide or assign the protocol name to ID number binding to an App Flow module that is responsible for implementing the App Flow VC at the client 102. The VC module can be part of the WinStation Driver, or include the WinStation Driver, or may be separate from the WinStation Driver. The VC module can be part of the client-side agent 502 (e.g., VDA), or include the client-side agent 502, or may be separate from the client-side agent 502. The client may load the VC module to implement, initiate and/or establish the App Flow VC at the client 102. The client may send or report the VC-bind information to the server 106 in the same message (e.g., init-response packet or message) or another message (e.g., another init-response packet or message). The VC-bind information may be sent on behalf of the WinStation Driver responsible for implementing the core ICA protocol that supports the App Flow VC and/or any other VCs. The server 106 can receive the VC-bind information (e.g., VC protocol name to ID number binding), and can use the VC-bind information to access or otherwise open the App Flow VC and send data on it. The VC-bind information can be used by any of the network device(s) 604 in the network link 518 to find and parse out the App Flow VC among other VCs and core protocol.

Referring to operation 5, the server 106 may commit capabilities for the App Flow VC and/or the ICA/HDX session. The server 106 may receive a message (e.g., init-response packet or message) from the client 102, which can include at least one of: the App Flow capability or the VC-bind information. The server can parse, extract, determine and/or analyze the App Flow capability received from the client 102. For example, the server can detect, identify or determine the protocol versions and/or additional flags that might have been set by the client and network device(s) in the App Flow capability.

The server 106 can compute or determine a Session protocol version and/or Session protocol flag(s), for instance using or according to information set in the App Flow capability. For example, the Session protocol version may be set to either 0 or the minimum value of the protocol versions reported by all of the entities (e.g., server, network device(s), client). The Session protocol version can be set to 0 if no network device 604 between the client 102 and the server 106 supports it (e.g., supports the App Flow VC or feature), or if the client 102 does not support it (e.g., supports the App Flow VC or feature), or if the App Flow VC itself is not reported by the client 102 in a protocol name to ID number binding, and/or if there is neither protocol-level encryption or custom App Flow VC-level encryption negotiated for the session. If the value of the Session protocol version is 0, then no App Flow VC is created or established for the session (e.g., ICA, RDP or HDX session).

The server 106 can commit or finalize the Session protocol version (e.g., if this value is not 0) and/or the Session protocol flag(s) that are computed or determined. The server 106 can communicate or propagate the committed Session protocol version and/or the Session protocol flag(s) to all other entities (e.g., network device(s), client) by including these in an App Flow capability in a message (e.g., an init-connect packet or message) sent from the server to the client. All or some of these entities can read the committed Session protocol version and/or Session protocol flag(s). This process can avoid creating the App Flow VC and/or sending App Flow data points (e.g., insights) unnecessarily if no network devices in the network link (between the client 102 and the server 106) is present, interested in or capable of processing the App Flow insights, and/or if the client-side agent 502 does not support the App Flow feature, and/or if encryption (e.g., protocol-level encryption, or custom App Flow VC encryption) is not negotiated or present. For instance, and in some embodiments, the capability exchange process described herein may also be used to negotiate custom App Flow VC protocol-level encryption methods and keys, so that data sent over the App Flow VC can only be decrypted by a designated network device or the client (e.g., that has access to the custom App Flow VC protocol-level encryption methods and keys).

The server 106 can initiate, establish, create and/or open the App Flow VC, and can start inserting, writing, providing and/or sending various insights (e.g., events and data points) into the App Flow VC. The server 106 can initiate, establish, create and/or open the App Flow VC, and/or provide the insights, responsive to at least one of: determining that the Session protocol version is not 0, committing the Session protocol version and/or the Session protocol flag(s), or sending the committed Session protocol version and/or the Session protocol flag(s) to the other entities. The server 106 can open or create the App Flow VC in the session (e.g., HDX or ICA session), and can leave the protocol packets of App Flow VC (and/or other VCs) uncompressed (e.g., in the top level ICA/HDX protocol), and can leave the protocol packets of App Flow VC (and/or other VCs) non-interleaved (e.g., to facilitate parsing by other entities). The App Flow VC data stream can be compressed (e.g., at the App Flow protocol level). The server 106 can provide session data (e.g., in JSON format or protocol) from various stack or VC components, into corresponding VCs, which may be implemented in user or kernel-mode. The session data can include insights that are directed into the App Flow VC. The App Flow VC can carry messages formed and sent in JSON format, to facilitate parsing by interested entities (e.g., network devices) and/or the client, and to ensure easy extensibility. For instance, the network devices (e.g., gateway and/or SD-WAN devices) may be configured to support and understand the JSON format. However, any other format can be used, that for instance is supported by the entities and/or can be efficiently transmitted and processed.

The App Flow VC can communicate, transmit, carry or convey one or more App Flow messages (e.g., in JSON or other format). Each App Flow messages may include at least one of:
  Transport stack connection ID;
  HDX Session Globally Unique Identifier (GUID) (facilitates correlation of each individual data point with a user and session environment);
  Terminal Services Session ID;
  context (additional context to allow other entities to correlate data points);
  timestamp; and
  source (e.g. Virtual Channel or other system component originating the data point).

In some embodiments, a message may include or contain at least one of: (a) Key (Name), (b) Type, or (c) Value. Messages may be categorized in at least three different groups/types:

i) Version: Such a message can be a first message (e.g., JSON message) sent over the App Flow VC from server to client. Such a message can denote the JSON protocol version, which may be different from the App Flow VC protocol version. Such a message can be used to advertise the set of events and data points implemented by the server to other entities. Similarly, such a message may be a first message (e.g., JSON message) sent over the App Flow VC from client to server, and can be used for a similar purpose.

ii) Event: Such a message can allow the server to signal the occurrence of an event on the server. For example, the server may send an event that signals that "something happened" for a particular VC in a HDX session, or indicate another system event. Similarly, such a message can be used by the client to raise events with other entities.

iii) Key Value: Such a message can describe an individual single data point. For example, such a message can describe that a certain data point has this specific value for a virtual channel in an HDX session.

By way of illustration, events can include but is not limited to one or more of the following:
  Application launch, timestamp
  Application termination, timestamp
  Process termination, timestamp
  Session disconnection/termination, timestamp
  USB announce device
  USB device accepted
  USB device rejected
  USB device gone
  USB device reset
  USB device reset endpoint By way of illustration, data points can include but is not limited to one or more of the following:
  Domain name
  Logon ticket
  Server name
  Server version
  Session type (e.g., desktop, application)
  Client name
  Client version
  Client serial number
  Application name
  Application module path
  Application process ID
  Application launch time
  Application termination time
  Session termination time
  Launch mechanism
  Automatic reconnection/Session reliability mechanism
  ICA Round Trip Time (RTT)
  Layer 7 (L7) latency
  VC bandwidth
  Multi-stream ICA (MSI) stream type (primary or secondary)

Referring to operation 5', the client 102 can read the session capabilities, can open the App Flow VC, and can write data into the App Flow VC. The client 102 may read the Session protocol version and/or Session protocol flag(s) committed by the server 106. According to the instructions (e.g., the committed Session protocol version and Session protocol flag(s)), the client 102 may access or open the App Flow VC. Similar to the server 106, the client 102 may send data points via the App Flow VC in the client-to-server direction, to be retrieved by one or more network devices and/or the server 106.

Referring to operation 6, a network device (e.g., gateway or SD-WAN device) 604 may read or access the data (e.g., insights) from the App Flow VC (e.g., data packet or data stream in the App Flow VC). Each interested or capable network device 604 may read the Session protocol version and/or Session protocol flag(s) committed by the server 106. As instructed by the server 106 (e.g., via the committed Session protocol version and/or Session protocol flag(s)), a respective network device 604 may efficiently parse out (e.g., relative to deep parsing) the App Flow VC among other VCs and core protocol (e.g., using the VC-bind information), and may read the insights (e.g., data points) carried in the App Flow VC. The VC-bind information (e.g., VC protocol name to ID number association) may be useful to the network device 604 to detect, identify and/or parse out the App Flow VC among other VC protocols (e.g., VC-specific or VC-level protocols) and core (or top level ICA/HDX) protocol. The network device 604 may ignore all other protocol(s). This can be further facilitated by the fact that the App Flow VC packets are uncompressed (e.g., at the top level protocol) and non-interleaved. This can substantially improve the number of HDX sessions that may be supported by a network device 604 such as a gateway or SD-WAN device. This also improves the user experience on HDX sessions, since a network device 604 is no longer a bottleneck for processing (e.g., deep parsing) and throughput. The network device 604 may decrypt data points (e.g., at the App Flow VC protocol level) if encryption had been negotiated. (See, e.g., test results discussed below.)

Referring to operation 7, the network device 604 can combine the received App Flow VC data with additional network analytics. The network device 604 can combine the received App Flow VC data with additional network analytics generated, accessed and/or provided by the network device 604, to form or produce combined insights. The network device 604 can send the combined insights to a management tool or service 602 (e.g., analytics service) for further analysis and/or presentation to an administrator. For example, combined insights may be sent to Citrix Director or Citrix Management and Analytics System (MAS) or a third-party Insights tools. Citrix MAS can correspond to or include a centralized network management and analytics system. From a single platform, administrators can view, manage network devices, and troubleshoot network related issues, or issues with specific published desktops and applications. In some embodiments, the management tool or service (e.g., MAS) 602 may be configured as an App Flow collector on a network device (e.g., Citrix Gateway or Citrix SD-WAN) 604, through which HDX/ICA traffic is flowing. The management tool or service (e.g., MAS) 602 may receive the records (e.g., combined insights) from the network device (e.g., Citrix Gateway or Citrix SD-WAN) 604, analyze the records, and can present them (e.g., in HDX Insight administrator view). The presented data (e.g., in HDX Insights administrator view) may help administrators in troubleshooting issues related to latencies, bandwidth, desktop or application launch time, desktop or application response time, etc.

Referring to operation 8, the client-side agent 502 can read and can drop (e.g., ignore, remove, discard, filter away) the App Flow VC data. The client 102 may read some or all data points, and can drop some or all data points that the client 102 is not interested in. The client 102 may parse, extract, read and/or interpret the data points (e.g., provided by the server) from the App Flow VC. For example, the client 102 may log information about the App Flow VC data, present information to the end user, respond back to the server, etc. The client may decrypt data points if encryption had been negotiated.

Referring to operation 8', the server-side agent 504 can read and can drop (e.g., ignore, remove, discard, filter away) App Flow VC data. Similar to the client 102, the server 106 may read and/or ignore some or all of the data points sent by the client 102. For instance, the server 106 may parse, extract, read and/or interpret the data points (e.g., provided by the client 102) from the App Flow VC. For example, the server 106 may log, present information to the end user, respond back to the client 102, etc. The server 106 may decrypt data points if encryption had been negotiated.

In some embodiments, the client-side agent 502 (e.g., Workspace App) may send some data points on the App Flow VC, which can be correlated with server-side agent 504 (e.g., VDA) data points to provide more insights into an HDX Session. In certain embodiments, the server-side agent 504 (e.g. VDA) may implement, add or insert data points with session or app-specific details, e.g. URL's that may be accessed in the session, etc.

In some embodiments, one or more alternative methods of implementing the App Flow VC may include: (a) Separating CGP connections from a network device to the server-side agent (e.g. VDA); (b) Channeling data from the server-side agent (e.g. VDA) to the monitoring tool/service (e.g. Director/MAS) over an independent transport layer connection; (c) Based on uniquely identifying Connection ID/Session GUID exchanged over HDX protocol, sending tagged data points from each entity (e.g., client-side agent, network device, server-side agent) directly to a Cloud Service. Then the Cloud Service may correlate the data points from the different sources based on a tag (Connection ID/Session GUID). This architecture is more appropriate to customers/organizations that are more willing to accept the use of a Cloud Service as opposed to on-premises customer/organization owned/controlled network devices and services.

Cloud services can be used in accessing resources including network applications. Cloud services can include an enterprise mobility technical architecture, which can include an access gateway in one illustrative embodiment. The architecture can be used in a bring-your-own-device (BYOD) environment for instance. The architecture can enable a user of a client device (e.g., a mobile or other device) to both access enterprise and personal resources from a client device, and use the client device for personal use. The user may access such enterprise resources or enterprise services via a client application executing on the client device. The user may access such enterprise resources or enterprise services using a client device that is purchased by the user or a client device that is provided by the enterprise to user. The user may utilize the client device for business use only or for business and personal use. The client device may run an iOS operating system, and Android operating system, or the like. The enterprise may choose to implement policies to manage the client device. The policies may be implemented through a firewall or gateway in such a way that the client device may be identified, secured or security verified, and provided selective or full access to the enterprise resources. The policies may be client device management policies, mobile application management policies, mobile data management policies, or some combination of client device, application, and data management policies. A client device that is managed through the application of client device management policies may be referred to as an enrolled device. The client device management policies can be applied via the client application for instance.

In some embodiments, the operating system of the client device may be separated into a managed partition and an unmanaged partition. The managed partition may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the client device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is not accessible by unmanaged apps and devices.

The secure applications may be email applications, web browsing applications, software-as-a-service (SaaS) access applications, Windows Application access applications, and the like. The client application can include a secure application launcher. The secure applications may be secure native applications, secure remote applications executed by the secure application launcher, virtualization applications executed by the secure application launcher, and the like. The secure native applications may be wrapped by a secure application wrapper. The secure application wrapper may include integrated policies that are executed on the client device when the secure native application is executed on the device. The secure application wrapper may include metadata that points the secure native application running on the client device to the resources hosted at the enterprise that the secure native application may require to complete the task requested upon execution of the secure native application. The secure remote applications executed by a secure application launcher may be executed within the secure application launcher application. The virtualization applications executed by a secure application launcher may utilize resources on the client device, at the enterprise resources, and the like. The resources used on the client device by the virtualization applications executed by a secure application launcher may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources, and the like. The resources used at the enterprise resources by the virtualization applications executed by a secure application launcher may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application may use the user interaction data as an input to the application operating on the server. In this arrangement, an enterprise may elect to maintain the application on the server side as well as data, files, etc., associated with the application. While an enterprise may elect to "mobilize" some applications in accordance with the principles herein by securing them for deployment on the client device (e.g., via the client application), this arrangement may also be elected for certain applications. For example, while some applications may be secured for use on the client device, others might not be prepared or appropriate for deployment on the client device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the client device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the client device. The enterprise can use a client application, which can include a virtualization application, to allow access to applications that are deemed more properly operated on the server side. In an embodiment, the virtualization application may store some data, files, etc., on the mobile phone in one of the secure storage locations. An enterprise, for example, may elect to allow certain information to be stored on the phone while not permitting other information.

In connection with the virtualization application, as described herein, the client device may have a virtualization application that is designed to present GUIs and then record user interactions with the GUI. The virtualization application may communicate the user interactions to the server side to be used by the server-side application as user interactions with the application. In response, the application on the server-side may transmit back to the client device a new GUI. For example, the new GUI may be a static page, a dynamic page, an animation, or the like, thereby providing access to remotely located resources.

The client device may use cloud services to connect to enterprise resources and enterprise services at an enterprise, to the public Internet, and the like. The client device may connect to enterprise resources and enterprise services through virtual private network connections. The virtual private network connections, also referred to as microVPN or application-specific VPN, may be specific to particular applications (e.g., as illustrated by microVPNs), particular devices, particular secured areas on the client device (e.g., as illustrated by O/S VPN), and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes. The single-sign-on processes may allow a user to provide a single set of authentication credentials, which are then verified by an authentication service. The authentication service may then grant to the user access to multiple enterprise resources, without requiring the user to provide authentication credentials to each individual enterprise resource.

The virtual private network connections may be established and managed by an access gateway. The access gateway may include performance enhancement features that manage, accelerate, and improve the delivery of enterprise resources to the client device. The access gateway may also re-route traffic from the client device to the public Internet, enabling the client device to access publicly available and unsecured applications that run on the public Internet. The client device may connect to the access gateway via a transport network. The transport network may use one or more transport protocols and may be a wired network, wireless network, cloud network, local area network, metropolitan area network, wide area network, public network, private network, and the like.

The enterprise resources may include email servers, file sharing servers, SaaS/Web applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources may be premise-based resources, cloud based resources, and the like. The enterprise resources may be accessed by the client device directly or through the access gateway. The enterprise resources may be accessed by the client device via a transport network. The transport network may be a wired network, wireless network, cloud network, local area network, metropolitan area network, wide area network, public network, private network, and the like.

Cloud services can include an access gateway and/or enterprise services. The enterprise services may include authentication services, threat detection services, device manager services, file sharing services, policy manager services, social integration services, application controller services, and the like. Authentication services may include user authentication services, device authentication services, application authentication services, data authentication services and the like. Authentication services may use certificates. The certificates may be stored on the client device, by the enterprise resources, and the like. The certificates stored on the client device may be stored in an encrypted location on the client device, the certificate may be temporarily stored on the client device for use at the time of authentication, and the like. Threat detection services may include intrusion detection services, unauthorized access attempt detection services, and the like. Unauthorized access attempt detection services may include unauthorized attempts to access devices, applications, data, and the like. Device management services may include configuration, provisioning, security, support, monitoring, reporting, and decommissioning services. File sharing services may include file management services, file storage services, file collaboration services, and the like. Policy manager services may include device policy manager services, application policy manager services, data policy manager services, and the like. Social integration services may include contact integration services, collaboration services, integration with social networks such as Facebook, Twitter, and LinkedIn, and the like. Application controller services may include management services, provisioning services, deployment services, assignment services, revocation services, wrapping services, and the like.

The enterprise mobility technical architecture of cloud services may include an application store. The application store may include unwrapped applications, pre-wrapped applications, and the like. Applications may be populated in the application store from the application controller. The application store may be accessed by the client device through the access gateway, through the public Internet, or the like. The application store may be provided with an intuitive and easy to use User Interface.

Figure 7:
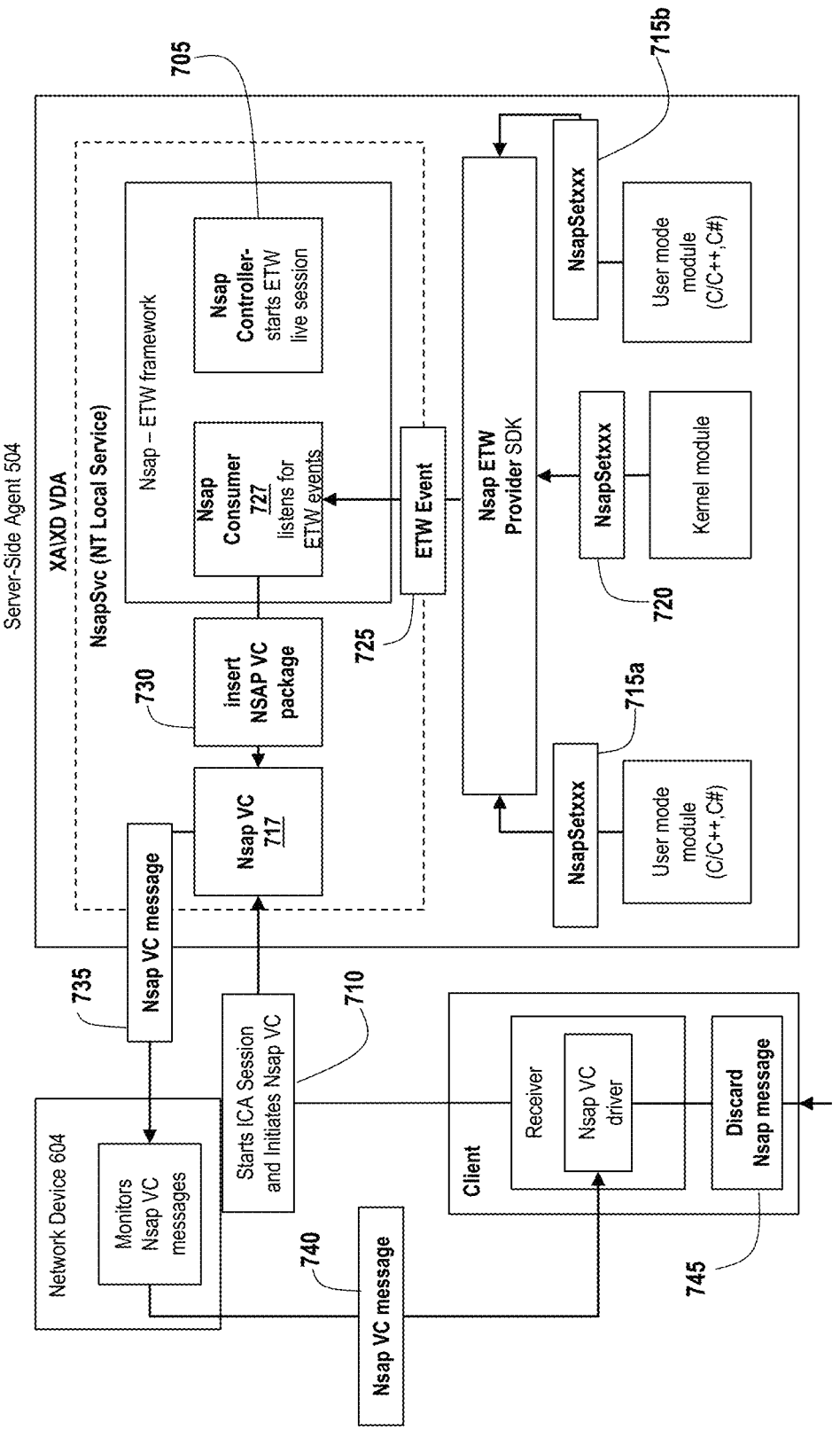
FIG. 7 is a block diagram of an embodiment of a system for App Flow data points collection and transmission, according to an illustrative embodiment.

Referring to FIG. 7, an example system that illustrates an implementation of App Flow 700 data points collection and transmission at a server (or server-side agent or VDA) is depicted. The system can include a client-side agent 502 (e.g., Citrix Workspace App or Receiver), a server-side agent 504 (e.g., Citrix Virtual Apps and Desktops VDA), and a network device 604 (e.g., a NetScaler device). In connection with FIG. 7 for instance, NetScaler App Flow (NSAP) is sometimes also referred to as App Flow. Citrix NetScaler (or NetScaler) is referenced here by way of example, and can also be replaced with any type or form of network device. VDA is referenced here by way of example, and can also be replaced with any type or form of server-side agent 504. Likewise, Citrix Workspace App (or Receiver) is referenced here by way of example, and can also be replaced with any type or form of client-side agent 502. The following is an example process flow, and can include some or all of the following operations:

At operation 705, after the VDA boots, the NSAP service on the VDA can instantiate an Event Tracing for Windows (ETW) Controller and can start an ETW live session. At operation 710, the Citrix Workspace App can start an ICA session and a new NSAP driver can initiate the NSAP VC from the Receiver endpoint. The NSAP driver may discard all data coming on this NSAP VC, or it can use the statistics received. At operation 715*a* and 715*b*, user mode HDX components on the VDA can use the NSAP SDK (NsapSetxxx) to send data points to Citrix Netscaler App Experience Service (CtxNsapSvc) 717. At operation 720, Kernel mode HDX components on the VDA can use the NSAP SDK (NsapSetxxx) to send data points to CtxNsapSvc. At operation 725, a CtxNsap provider library can send ETW events to the NSAP ETW Consumer 727 hosted by CtxNsapSvc. At operation 730, the NSAP Service can encapsulate the data points (e.g., into a JSON format) and can send it to the NSAP virtual channel (or App Flow VC). At operation 735, network device 604 (e.g., NetScaler) can intercept the NSAP VC message and can extract the required data. At operation 740, the message can further be transmitted to the Citrix Workspace App along with all other HDX traffic. At operation 745, the Receiver NSAP VC driver may discard the NSAP VC message. In testing mode, the NSAP VC driver may parse the content and can display it in DebugView or in a file for test automation purposes. The NSAP VC driver may also interpret the data in non-testing mode.

Referring to FIGS. 8-10, illustrative test results are provided including those from an implementation using an App Flow VC. The session bandwidth (BW) in each of FIGS. 8 and 9 can refer to HDX traffic load. FIG. 8 depicts a graph 800 of example test results on number of ICA/HDX sessions for a session bandwidth of 125 Kbps (e.g., typical workload). The test results, from left to right, show the case where no insights were parsed (when no App Flow VC is implemented), the case where deep-parsing is performed (when no App Flow VC is implemented), and the case where App Flow VC is implemented for efficient parsing. FIG. 9 depicts a graph 900 of example test results on number of ICA/HDX sessions for a session bandwidth of 400 Kbps (e.g., graphics rich workload). The test results, from left to right, show the case where no insights were parsed (when no App Flow VC is implemented), the case where deep-parsing is performed (when no App Flow VC is implemented), and the case where App Flow VC is implemented for efficient parsing. For each session bandwidth, the number of HDX sessions that can be served is about 2.5× higher with the App Flow VC based implementation, as compared with the deep parsing implementation. The actual difference is likely to be higher because of certain bottlenecks in the test setup. As discussed earlier, deep parsing is computationally and resource intensive, which reduces the number of HDX sessions that can be served. Even when the App Flow VC is used (and some computational resource is consumed for a more efficient parsing), the number of HDX sessions that can be served appear to be similar to the case where no insights were parsed.

FIG. 10 depicts a graph 1000 of example test results on network device CPU usage (e.g., Gateway appliance packet engine CPU usage). The test results show the case where no insights were parsed (when no App Flow VC is implemented), the case where deep-parsing is performed (when no App Flow VC is implemented), and the case where App Flow VC is implemented for efficient parsing. The CPU usage is shown under the condition that the number of sessions are maxed out. Sessions are considered maxed out when outgoing bandwidth goes down by 10% and user experience (UX) becomes sluggish. The test results show that when App Flow VC is used (and some computational resource is consumed for a more efficient parsing), the level of CPU usage (about 23%) is only slightly higher than that for case where no insights were parsed (about 15%). Hence, CPU usage under the App Flow VC based implementation is fairly low even when number of sessions are maxed out. However, in the case where deep-parsing is performed, the CPU usage (which is near 100%) is much higher than both of the other cases.

Referring now to FIG. 11, depicted is a flow diagram of a method 1100 of establishing independent application flow virtual channels. The method 1100 may be performed or implemented using any of the components detailed herein, for example, the client 102, the server 106, the appliance 200, the network link 518, or the network device 604, among others. In brief overview, a first computing device may send a request message for virtual channels (1105). The first computing device may receive a response message indicating capabilities (1110). The first computing device may determine capabilities in supporting virtual channels (1115). The first computing device may establish virtual channels (1120). The first computing device may identify insights from virtual channel (1125).

In further detail, a first computing device (e.g., the client 102 or the server 106) may send a request message for virtual channels (e.g., virtual channels 506a-n or 508a-n) (1105). The request message may be transmitted, provided, or otherwise sent by the first computing device to a second computing device (e.g., the client 102 or the server 106), and may be communicated via an intermediary device (e.g., a network device 604 in the network link 518). The request message may be a request to setup or establish at least one virtual channel for an application flow feature (also referred to as an insights virtual channel) of the first computing device or the second computing device, or the intermediary device. The first computing device may generate the request message to indicate one or more capabilities of the first computing device (and/or to request one or more capabilities of other devices) to support an insights virtual channel between the first computing device and the second computing device. The capabilities may indicate compatibility of the first computing device in supporting an insights virtual channel, and may indicate types of insights data transferrable via the virtual channel. In some embodiments, the capabilities may include one or more protocol versions supportable by the first computing device in using at least one of the virtual channels to support insights. For example, the request message can indicate the highest version or most recent version of the protocol supported by the first computing device in accordance to which the insights are to be provided via the virtual channel.

The first computing device may receive a response message indicating capabilities (1110). The response message may be identified, obtained, or received by the first computing device from the second computing device, and may be communicated via the network device (e.g., through the network link 518). Upon receipt of the request message from the first computing device, the second computing device may generate the response message to include the one or more capabilities of the second computing device to support an insights virtual channel between the first computing device and the second computing device. The capabilities may indicate compatibility of the second computing device in supporting an insights virtual channel, and may indicate types of insights data transferrable via the virtual channel. In some embodiments, the capabilities may include one or more protocol versions supportable by the second computing device in using at least one of the virtual channels to support insights.

In some embodiments, the second computing device may generate the response message to include information for establishing the virtual channel to support insights. The information may include: an identifier of a protocol (e.g., protocol type, protocol name, or ICA protocol) in accordance to which data is to be communicated via the insights virtual channel, an identifier of the virtual channel itself to be used as the insights virtual channel, and a component (e.g., WinStation, VC module, or other application or communication interface) of the first computing device to use the insights virtual channel, among others. The information may also include an association between the identifier of the protocol and the identifier of the virtual channel, or an association between the identifier of the protocol and the component of the first computing device (e.g., VC bind information). With the generation of the response message, the second computing device may transmit the response message to the first computing device.

When transmitted from the second computing device, the intermediary device may identify, intercept, or otherwise receive the request message. Upon receipt or interception, the intermediary device may insert the one or more capabilities of the intermediary device to support the insights virtual channel between the first computing device and the second computing device via the intermediary device. The capabilities may indicate compatibility of the intermediary device in supporting an insights virtual channel, and may indicate types of insights data transferrable via the virtual channel between the first computing device and the second computing device. In some embodiments, the capabilities may include one or more protocol versions supportable by the intermediary device in using at least one of the virtual channels to support insights. In some embodiments, the intermediary device may include or insert information for establishing the virtual channel to support insights. The information inserted by the intermediary device may be the same as described above with respect to the second computing device. With the insertion of the capabilities or information, the intermediary device may forward or otherwise send the response message to the first computing device.

The first computing device may determine capabilities in supporting virtual channels (1115). Upon receipt of the response message, the first computing device may parse the response message to identify the capabilities of the second computing device and the network device in supporting an insights virtual channel. By parsing the response message, the first computing device may determine the capabilities in supporting the insights virtual channel. From the response message, the first computing device may identify the one or more protocol versions supported by the second computing device and the intermediary device. Based on the identification, the first computing device may find, identify, or determine at least one protocol version for the insights virtual channel supported by the first computing device, the second computing device, and the intermediary device. For example, the first computing device may determine the highest or most recent protocol version supported by all three devices. In addition, the first computing device may identify the information for establishing the insights virtual channel from the response message, such as the association between the identifier of the protocol and the identifier of the virtual channel or the association between the identifier of the protocol and the component of the first computing device (e.g., VC bind information).

The first computing device may establish virtual channels (1120). A set of virtual channels may be established between the first computing device and the second computing device via the intermediary device. In some embodiments, the virtual channels in the set may be interleaved with each other to carry data between the first computing device and the second computing device. The data carried via the virtual channels may be compressed. Separately from the set of virtual channels, the first computing device may initiate, setup, or otherwise establish an insights virtual channel. The insights virtual channel may be separate from (e.g., not interleaved with) the other virtual channels between the first computing device and the second computing device. The insights virtual channel may carry uncompressed data relating to analytics regarding the communications between the first computing device and the second computing device via the intermediary device. The insights virtual channel may be used by one or more of the three devices, such as the first computing device, the second computing device, and the third computing device (e.g., an intermediary device or network device 604 in the network link 518).

The establishment of the insights virtual channel may be in accordance with the capabilities the first computing device, the second computing device, and the intermediary device. In some embodiments, the first computing device may use at least one protocol version identified as supported by the first computing device, the second computing device, and the intermediary device to establish the insights virtual channel. For example, the first computing device may use the highest or most recent protocol version determined to be supported by all three devices to establish the insights virtual channel. In some embodiments, the first computing device may generate and send the information on establishment of the insights virtual channel to the second computing device and the intermediary device. The information may have been lacking in the response message from the second computing device or the intermediary device, and may be generated by the first computing device. The information may include, for example, the association between the identifier of the protocol and the identifier of the virtual channel or the association between the identifier of the protocol and the component of the first computing device (e.g., VC bind information). Once generated, the first computing device may send the information via one of the set of virtual channels previously established between the first computing device and the second computing device.

The first computing device may identify insights from the insights virtual channel (1125). With the establishment of the insights virtual channel, the first computing device may exchange analytics data (sometimes referred herein as insights or metrics) regarding the first computing device, the second computing device, any other device(s), and/or the communication between the first computing device and the second computing device via the network link of the intermediary device. The analytics data may include events and data points, e.g., regarding the communication session as described herein above. The analytics data may be uncompressed and may be non-interleaved with other data, and may be lacking in the other set of virtual channels established between the first computing device and the second computing device. To access, the first computing device may identify the insights virtual channel from the virtual channels using the setup information. The information may include, for example, an identifier of the protocol, an identifier of the virtual channel, or the component of the first computing device to use the insights virtual channel, among others, or any association there between. Once the insights virtual channel is identified, the first computing device may retrieve, identify, or otherwise access the analytics data (e.g., from the second computing device or the intermediary device). In some embodiments, the first computing device may request, fetch, or otherwise retrieve the analytics data from the second computing device or the intermediary device. In some embodiments, upon establishment of the insights virtual channel, the first computing device, the second computing device, and the intermediary device all may commence exchanging or sharing analytics data via the insights virtual channel. Using the analytics data, the first computing device, the second computing device, or the intermediary device may re-configure, adjust, or set the data exchanged or shared via the other virtual channels.

State Transition of App Flow Metrics During Network Appliance Failover (High-Availability)

Referring now to FIG. 12, depicted is a block diagram of a system 1200 for transitioning application flow metrics during appliance failover. The system 1200 may include one or more components detailed herein in conjunction with FIGS. 5-11, such as the client 102, the client-side agent 502, one or more network devices 604*a* and 604*b* (sometimes referred herein as a gateway or an intermediary device), at least one virtual channel 506 and 508, a server-side agent 504, and a server 106. In overview, a virtual channel (e.g., an insights virtual channel) may be rerouted or redirected from one network device 604*b* to another network device 604*a*. For instance, one of the network devices 604*a* or 604*b* (hereinafter generally referred to as network device 604) may determine whether to re-route a virtual channel from itself to another network device 604. In some embodiments, a client 102 or server 106 may detect a failure or failover situation associated with a first network device 604*b*, and may determine whether to re-route a virtual channel through the first network device 604b to another network device 604a. The virtual channel 506 and 508 may have been established between the client 102 and server 106 through the network device 604. The re-routing may be performed in response to a network (application) failover. In response to the determination, the network device 604 may identify or receive a protocol state of the virtual channel. The protocol state may include information regarding the establishment of the virtual channel, such as an association between the protocol identifier with the identifier of the virtual channel or between the protocol identifier with a component of the client 102 or server 106 (e.g., WinStation, VC module, or another application). Using the protocol state, the network device 604 may access the insights exchanged across the insights virtual channel 506 or 508. The insights may be from the client 102, the server 106 or another network device, and may be communicated through the network device 604.

State Transition Via Shared State

In some embodiments, and by way of a non-limiting example, a network device (e.g., the network device 604 of system 1200) may be load-balanced, e.g., a Gateway may be load-balanced between Gateway instance 1 (e.g., network device 604b) and Gateway instance 2 (e.g., network device 604a). A specific HDX session may be initially established from client 1 via Gateway 1 to VDA host 1. An App Flow VC may have been established and data points may have been transmitted. ICA protocol-level encryption may have been negotiated and used, e.g., Basic or Secure ICA encryption. App Flow VC-specific protocol-level encryption may have been negotiated and used. A failure of Gateway 1 (e.g., network device 604b) may cause the connection to be re-routed via Gateway 2 (e.g., network device 604a). In another scenario, a network disruption may cause client 1 to re-establish transport level connection, which in turn may re-route the connection via Gateway 2, even without any failure at Gateway 1. In both of these cases, the client 1 can reconnect to the host HDX session (e.g., using standard CGP Session Reliability mechanism).

In transitioning the App Flow state from Gateway 1 to Gateway 2, there can be a problem with continuing to re-interpret the protocol traffic, including decrypting ICA protocol-level encryption and/or App Flow protocol-level encryption, and identifying App Flow VC messages. Protocol state maintained by Gateway 1 can be continuously saved in shared storage, or at a globally available service, or a Remote Dictionary Server (Redis), etc. The protocol state may include, but is not limited to any one or more of the following: (a) App Flow VC negotiated capabilities: Session protocol version and flags, protocol version and flags for each entity; (b) App Flow VC protocol name to ID number association/binding; (c) Recorded App Flow VC version, events, data points; (d) Encryption method, keys, last encrypted byte at ICA protocol-level; and/or (e) Encryption method, keys, last encrypted byte at App Flow VC protocol-level.

Gateway 2 may retrieve and restore the shared protocol state from shared storage, identified by protocol-level identifier such as CGP cookie, Session GUID, etc. To continue parsing App Flow VC messages, Gateway 2 may for example perform any one or more of the following: (a) Re-synchronize transmitted and received packets at CGP-level; (b) Use last encrypted byte (at ICA protocol-level) to continue to decrypt ICA traffic and maintain encryption state; (c) Optionally, for optimization, use flags in CGP protocol to indicate presence of self-contained App Flow VC message; (d) If Gateway 2 can support the same Session capabilities as the already negotiated ones by Gateway 1: use last encrypted byte (at App Flow VC protocol-level) to continue to decrypt App Flow VC messages and maintain encryption state. Otherwise: Do not support App Flow VC; or clear protocol state and trigger re-negotiation of App Flow VC protocol capabilities as previously described. This may cause delay in processing but can ensure that App Flow functionality is still supported. Thus, the App Flow state can be successful transitioned from Gateway 1 to Gateway 2, and Gateway 2 can continue to receive and interpret new events and data points.

State Transition Via in-Line State Re-Initialization

In some scenarios, the protocol state may not be easily, efficiently or quickly shared between different Gateway instances (e.g., the network devices 604 of system 1200). For example, for purposes of high-availability and resiliency, redundant Gateway instances may reside on different cloud platforms, e.g., Microsoft Azure or Amazon AWS. For additional resiliency a redundant Gateway instance may exist in a co-location facility or on-premises. Therefore, as an alternative, the App Flow channel (or VC) may be designed as stateless or, rather, during failover the new Gateway instance may be re-initialized (or re-seeded) with sufficient state to continue parsing the App Flow data, where the re-initialization may be performed in-line via a tunneling protocol, e.g. CGP, or via the App Flow VC itself, or a combination. By way of a non-limiting example, the in-line state re-initialization process may occur as illustrated below:

A network device may be load-balanced, e.g., a Gateway may be load-balanced between Gateway instance 1 and Gateway instance 2. A specific HDX session may be initially established from client 1 via Gateway 1 to VDA host 1. An App Flow VC may have been established and data points may have been transmitted. As a result of determining that strong network-level encryption, e.g. with TLS or DTLS existing end-to-end, ICA protocol-level encryption, e.g., Basic or Secure ICA encryption, may be turned off. App Flow VC-specific protocol-level encryption may have been negotiated and used. A failure of Gateway 1 may cause the connection to be re-routed via Gateway 2. In another scenario, a network disruption may have caused client 1 to re-establish transport, which in turn might have re-routed the connection via Gateway 2, even without any failure at Gateway 1. In both of these cases, the client could use the standard CGP Session Reliability mechanism to reconnect to the host HDX session.

When transitioning the App Flow state from Gateway 1 to Gateway 2, there can be a problem with continuing to re-interpret the protocol traffic, including App Flow protocol-level encryption, and identifying App Flow VC messages. In some embodiments, upon CGP reconnect, new CGP capability is exchanged. In client-to-host and/or host-to-client direction, the CGP capability carries sufficient data to allow Gateway 2 to identify the App Flow VC. This data can include the App Flow VC protocol name to ID number association/binding. Also upon CGP reconnect, the client and host can issue an event to their App Flow VC modules, which can instruct the App Flow VC itself to for instance (re)send one or more of the following: [1] App Flow VC negotiated capabilities: Session protocol version and flags, protocol version and flags for each entity (Unencrypted. First data point sent); [2] Encryption method, keys, last encrypted byte at App Flow VC protocol-level (Unencrypted); [3] App Flow VC JSON protocol version; [4] Session GUID; [5] Additional data points may also be sent reflecting current HDX session state; and so on. The bulk of historical data points that do not require real-time synchronization could still be stored in a globally reachable or replicated MAS.

To continue parsing App Flow VC messages, Gateway 2 may for example perform one or more of the following: (a) Re-synchronize transmitted and received packets at CGP-level; (b) Optionally, for optimization, use flags in CGP protocol to indicate presence of self-contained App Flow VC message; (c) Use the App Flow VC protocol name to ID number association/binding to start parsing the App Flow VC; (d) If Gateway 2 can support the same Session capabilities as the already negotiated ones by Gateway 1 (which can be a reasonable assumption for Cloud instances where capabilities can be kept uniform): i) Queue all App Flow VC packets, e.g. those previously CGP-buffered by client and/or host and now re-synchronized by CGP, until packets with unencrypted data points [1] and [2] above are received, ii) Use last encrypted byte (at App Flow VC protocol-level) to continue to decrypt App Flow VC messages and maintain encryption state, and iii) Interpret and flush the previously CGP-buffered data points, if any; (e) Otherwise (if Gateway 2 cannot support the same Session capabilities as the already negotiated ones by Gateway 1): i) Do not support App Flow VC, or ii) clear protocol state and trigger re-negotiation of App Flow VC protocol capabilities as previously described. This may cause delay in processing but can ensure that App Flow functionality is still supported. Thus, the App Flow state can be successful transitioned from Gateway 1 to Gateway 2, and Gateway 2 continues to receive and interpret new events and data points.

State Transitions During Appliance Failover

Referring now to FIG. 13, depicted is a flow diagram of a method 1300 of transitioning application flow metrics during appliance failover. The method 1300 may be performed or implemented using any of the components detailed herein, for example, the client 102, the server 106, the appliance 200, or the network device 604 (or network device 604a or 604b of system 1200), among others. The method 1300 can include the functionalities described herein, such as state transition via shared state and state transition via in-line state re-initialization. In brief overview, a first intermediary device may determine whether a virtual channel is re-routed (1305). If not re-routed, the first intermediary device may monitor the virtual channels (1310). If re-routed, the first intermediary device may receive a protocol state (1315). The first intermediary device may identify information and capabilities from the protocol state (1320). The first intermediary device may perform a state transition (1325). The first intermediary device may access insights communicated via a virtual channel (1330).

In further detail, a first intermediary device (e.g., the network device 604b) may determine whether an insights virtual channel (e.g., virtual channel 506 or 508) (1305) is re-routed. The insights virtual channel may be established between a first computing device (e.g., the client 102 or the server 106) and a second computing device (e.g., the client 102 or the server 106). Furthermore, the insights virtual channel may have been initially established through a second intermediary device (e.g., the network device 604b) between the first computing device and the second computing device. The insights virtual channel may be re-routed from the second intermediary device to the first intermediary device in response to a failure at or associated with the second intermediary device. The failure causing the re-routing may include, for example, a network disruption causing interruption of the insights virtual channel, disabling of the second intermediary device, or any other event leading to the second intermediary device being unable or unsuitable to handle or carry the insights virtual channel between the first and second computing device. To determine whether the insights virtual channel is to be re-routed, the first intermediary device may monitor the insights virtual channel for one or more failures at or associated with the second intermediary device. Upon detection of the failure, the first intermediary device may determine that the insights virtual channel is to be re-routed. Otherwise, if the insights virtual channel is determined to be maintained or not re-routed, the first intermediary device may monitor the virtual channels (1310). The first intermediary device may continue to monitor for re-routing of the insights virtual channel from another device (e.g., the second intermediary device or another network device 604) to the first intermediary device, and may repeat the functionality of (1305).

If the insights virtual channel is determined to be re-routed, the first intermediary device may receive a protocol state (1315). The first intermediary device may access, retrieve, or otherwise access the protocol state of the insights virtual channel re-routed from the second intermediary device to the first intermediary device. The protocol state may be used to re-configure the insights virtual channel upon re-routing from one intermediary device to another intermediary device. In some embodiments, the first intermediary device may retrieve, identify, or otherwise receive the protocol state from the first computing device or the second computing device, between which the insights virtual channel was established. The protocol state may be received from a component (e.g., App Flow VC module, WinStation, or other application) of the first computing device or the second computing device.

In some embodiments, the first computing device may identify the protocol state from another source, besides the first computing device, the second computing device, or the second intermediary device. The protocol state for the insights virtual channel may be stored and maintained on a shared storage (e.g., a database in the network link 518). The shared storage may be accessible by one or more intermediary devices. For example, when the second intermediary device established the insights virtual channel between the first and the second computing devices, the second intermediary device may have stored the protocol state for the insights virtual channel onto the shared storage. The first intermediary device may access the storage to retrieve, obtain, or otherwise identify the protocol state maintained thereon.

In some embodiments, the first intermediary device may use a protocol-level identifier to identify the protocol state. The protocol-level identifier may describe the communications through the insights virtual channel, such as a cookie or a session identifier. The first intermediary device may identify the protocol-level identifier from the insights virtual channel (e.g., based on the communications) to be re-routed from the second to the first intermediary device. The first intermediary device may also identify the protocol-level identifier from the shared storage accessible by one or more of the intermediary devices. With the identification, the first intermediary device may find or identify the protocol state of the insights virtual channel being re-routed in the shared database.

The first intermediary device may identify information and capabilities from the protocol state (1320). From the protocol state for the insights virtual channel, the first intermediary device may extract, obtain, or otherwise identify the information or capabilities, among other data. The protocol state may include information and capabilities in relation to the insights virtual channel. The first intermediary device may identify the information included in the protocol state. The information of the protocol state may be for the establishment or re-establishment of the insights virtual channel between the first computing device and the second computing device. The information may include: an identifier of a protocol (e.g., protocol type, protocol name, or ICA protocol) in accordance to which data is to be communicated via the insights virtual channel, an identifier of the virtual channel itself to be used as the insights virtual channel, and a component (e.g., WinStation driver, VC module, or other application or communication interface) of the first or the second computing device to use the insights virtual channel, among others. The information may also include an association between the identifier of the protocol and the identifier of the virtual channel or an association between the identifier of the protocol and the component of the first computing device (e.g., VC bind information), among others.

The first intermediary device may determine or identify the capabilities included in the protocol state. The capabilities may indicate the compatibility common among the first computing device, the second computing device, and the second intermediary device in supporting communications of analytics data across the insights virtual channel. The capabilities of the protocol state may be negotiated across the first computing device, the second computing devices, and one of the intermediary devices (e.g., the second intermediary device) to support communicating analytics data via the insights virtual channel. The insights virtual channel initially routed through the second intermediary device may be establish in accordance with negotiations across the first computing device, the second computing device, and the second intermediary device. The negotiations may include identifying the highest or most recent protocol version in accordance to which to setup the insights virtual channel in communicating the insights. The capabilities identified from the protocol state may include one or more protocol versions supportable by the first computing device, the second computing device, and the second intermediary device in using at least one of the virtual channels to support insights.

In some embodiments, the first intermediary device may identify or determine other data included in the protocol state. The protocol state for the insights virtual channel may also include data regarding the insights virtual channel itself or communications through the insights virtual channel, such as a protocol name, information about one or more events, and data points, among others. The protocol name may define or include an identifier corresponding to a type of protocol used to establish the insights virtual channel (e.g., ICA protocol). The information on the events may correspond to a function or an action by the first computing device or the second computing device, such as by an application or process running thereon. The data points may define or describe one or more events of one or more of the computing device(s) and the intermediary device(s), that can be communicated across the insights virtual channel. The protocol state for the insights virtual channel may also include data defining or supporting encryption of the communications across the insight virtual channel, such as an encryption method, an encryption key, and one of the encrypted bytes, among others. The encryption method may define a cryptographic technique or protocol used to encrypt or obfuscate the analytics data (e.g., the events and data points). The encryption key may define a transformation applied by the encryption method in obfuscating the analytics data. The encrypted byte may correspond to a chunk of the analytics data (in byte size) exchanged via the insights virtual channel. In some embodiments, the encrypted byte referred to in the protocol state may correspond to the last encrypted byte transmitted across the insights virtual channel prior to re-routing from the second intermediary device to the first intermediary device.

The first intermediary device may perform a state transition (1325). In re-routing the insights virtual channel from the second intermediary device, the first intermediary device may perform the state transition in accordance with a shared state or in-line state re-initialization technique as detailed herein. In some embodiments, the first intermediary device may re-synchronize packets transmitted or received via the insights virtual channel at a common gateway protocol level in performing the state transition. The common gateway protocol level may be defined by or may correspond to the protocol-level identifier. Using the gateway protocol level, the first intermediary device may determine a proper sequence of packets to synchronize the packets exchanged across the insights virtual channel. In some embodiments, the first intermediary device may initialize or re-initialize itself using a tunneling protocol to perform the state transition. The tunneling protocol may be performed using, for example, a common gateway protocol (CGP) or via an App Flow virtual channel itself.

In some embodiments, the first intermediary device may negotiate with the first computing device and the second computing device to re-establish the insights virtual channel from the second intermediary device to the first intermediary device itself. The negotiation may include determination of the highest or most recent protocol version supported by all three devices in communicating the analytics data via the insights virtual channel. Upon negotiation, the first intermediary device may establish the insights virtual channel between the first and the second computing device through itself. With the re-establishment, the first intermediary device may use the encryption method, key, and byte information (e.g., the last byte) to decrypt the analytics data previously exchanged across the insights virtual channel through the second intermediary device. By decrypting, the first intermediary device may identify or determine the last portion (e.g., the last byte) of the analytics data exchanged through the previous insights virtual channel. From the last portion, the first intermediary device may commence exchanging of the analytics data via the insights virtual channel between the first and second computing devices.

The first intermediary device may access insights communicated via the insights virtual channel (1330). Using the received protocol state, the first intermediary device may retrieve, identify, or otherwise access analytics data (sometimes referred herein as insights) exchanged across the insights virtual channel. In some embodiments, the first intermediary device may initiate accessing of the analytics data in response to performance of the state transition. The analytics data may be generated or may originate from the first computing device or the second computing device, and may include events and data points regarding the communication session as described herein above. The first intermediary device may identify the insights virtual channel from a set of virtual channels established between the first and the second computing device using the information. As discussed above, the information may include, for example, the association between the identifier of the protocol and the identifier of the virtual channel or between the identifier of the protocol and the component of the first computing device. With the identification of the insights virtual channel, the first intermediary device may identify, retrieve, or otherwise access the analytics data exchanged between the first computing device and the second computing device. In some embodiments, the first intermediary device may use the encryption method, key, or byte information of the protocol state to decrypt the analytics data exchanged through the insights virtual channel. The analytics data may have been encrypted prior to transmission by the first or the second computing device. By decrypting, the first intermediary device may recover the original analytics data.

Efficient Identification and Prioritization of Multi-Stream ICA (MSI) HDX Streams In multi-stream ICA (MSI), virtual channels may run on different MSI streams with priority 0-3. The streams with different priority can impart quality of service for the QoS for the virtual channels. In Multi-port ICA, separate ports have to be configured on the server-side agent 504 (e.g. VDA). A network device, referenced here as SD-WAN by way of illustration, can support MSI without multiple ports (e.g., using a single port) by deep parsing CGP and ICA. In this manner, the SD-WAN can perform cross-session caching and compression, thereby offloading reduction in consumption of ICA bandwidth and printing image compression, among other functionalities, via the data streams.

Referring now to FIG. 14, depicted is a block diagram of an example representation of MSI using a client-side network device 604a and a server-side network device 604b. In system 1400, although there can be any number of streams 1405 (e.g., MSI streams), the embodiment shown and discussed herein provides for 4 MSI streams by way of illustration: 1 primary stream, which handles the core ICA protocol and some VCs, and 3 secondary streams, which handle additional VCs. In some embodiments, App Flow VC messages are sent on the primary MSI stream, so a network device can parse only the primary stream to access insights from these messages in the App Flow VC. App Flow VC messages can also be sent on any other pre-determined MSI stream, as long as the network device can know or determine which stream to access the insights. To enable identification of the separate streams, their type and priority, stream-identifying data points can be initially sent on all MSI streams, e.g. the one primary MSI stream and three secondary MSI streams, as soon as each stream is created for instance. The stream-identifying data points can include at least one of, but may not be limited to: (a) Session GUID; (b) Stream ID; (c) Priority; or (d) Stream type: Primary vs. Secondary. For example, a network device (e.g., a Citrix SD-WAN) can use the priority to prioritize HDX traffic accordingly.

During the lifetime of an HDX session, the priority of individual VCs may change and they may be re-assigned to different streams. This has no impact on the App Flow processing, since the App Flow VC may always be processed on a predetermined (e.g., primary) stream. However, the priority of individual streams may also change, in which case stream-identifying data points may be sent again to indicate the change of priority. In some embodiments, a VC write operation may normally send the data point only on the dedicated stream associated with a VC, e.g. the primary stream in case of the App Flow VC. But in the case of an App Flow implementation, a modified VC write operation can be used to send each stream-identifying data point on the respective stream, to enable a network device to identify the separate streams, their type and current priority.

Referring now to FIG. 15, depicted is a flow diagram of a method 1500 of prioritizing data streams for virtual channels. The method 1500 may be performed or implemented using any of the components detailed herein, for example, the client 102, the server 106, the appliance 200, or the network device 604 (e.g., the network devices 604a or 604b of the system 1400), among others. In brief overview, a first intermediary device may establish data streams comprising virtual channels (1505). The first intermediary device may determine an identifier for each data stream (1510). The first intermediary device may determine a priority for each data stream (1515). The first intermediary device may send the information on priority in data streams (1520). In some embodiments, the functionalities of (1505)-(1520) may be performed by the server 106 or the server-side agent 504 (e.g., VDA).

In further detail, a first intermediary device (e.g., the network device 604a or 604b) may establish a set of data streams (e.g., data streams 1405) each comprising one or more virtual channels (e.g., virtual channels 508 or 506) (1505). Each data stream may include one or more virtual channels established between the first intermediary device and a second intermediary device (e.g., the network device 604a or 604b). One of the data streams may include an insights virtual channel to exchange analytics data between the first intermediary device and the second intermediary device. The establishment of the data streams including virtual channels may be in accordance to any of the techniques described herein in conjunction with FIGS. 5-14. The data stream may communicate data used to present a graphical user interface of an application hosted on one computing device (e.g., the server 106) on a display of a recipient computing device (e.g., the client 102). The data may be communicated via the data stream in accordance with a communications protocol, such as a multi-stream ICA protocol or a remote desktop protocol, among others. Upon establishment, the first intermediary device may transmit, receive, or otherwise communicate data from the sets of data streams to one of the computing devices (e.g., client 102 or the server 106). The data from the data streams may be communicated from the first intermediary device via a single port of the computing device.

The first intermediary device may determine an identifier for each data stream (1510). The first intermediary device may associate, assign, or otherwise determine the identifier of each data stream among the set of data streams established between the first computing device itself and the second computing device. The identifier for a data stream may uniquely reference one data stream, as distinguished from the other data streams in the set established between the first intermediary device and the second intermediary device. The identifier for the data stream may be, for example, a globally unique identifier for a session (e.g., the communication session supporting the set of data streams) or a stream identifier, among others. The identifier may be a numeric value or a set of alphanumeric strings, among others. In determining the identifier, the first intermediary device may create or generate the numeric value or the set of alphanumeric strings. Upon generation, the first intermediary device may associate or assign the identifier to the corresponding data stream. In some embodiments, the first intermediary device may determine the identifier in establishing the corresponding data stream between the first and second intermediary devices.

The first intermediary device may determine a priority for each data stream (1515). The first intermediary device may associate, assign, or otherwise determine the priority of each data stream among the set of data streams established between the first intermediary device itself and the second intermediary device. The priority of each data stream may define a level of precedence, importance, urgency and/or quality of service of the data stream among the set of data streams in communicating data between the first intermediary device and the second intermediary device. For example, data to be sent via data stream of a higher priority may be sent prior to data to be sent via another data stream of a lower priority. In some embodiments, to assign the priority, the first intermediary device may identify a type of each data stream. In some embodiments, in identifying the type of the data stream, the first intermediary device may specify, identify or determine a type of data communicated (or to be communicated) via the data stream. The data transmitted via the data stream including the virtual channels may include analytics data, audio, graphics, printer data, disk data, and metadata, among others.

Based on the type of data (e.g., to be supported or transmitted), the first intermediary device may classify, identify, specify and/or determine the type of data stream. Each virtual channel included in a data stream may be configured and/or dedicated to delivering a particular type of data. The first intermediary device may determine and/or specify the priority for each data stream (including the data stream with the insights virtual channel), corresponding to the type of the data stream. The determination/specification of priority may be in accordance with a listing of priorities for types of data streams and/or type(s) of virtual channels that may be carried in each type of data stream. For example, the listing may specify that the data stream carrying analytics or voice data (e.g., via an analytics or voice VC) is to have a higher priority than the data stream delivering printer data. In some embodiments, the first intermediary device may determine at least one of the data streams as a primary data stream and at least one other of the data streams as a secondary data stream. Data streams assigned as primary may be defined as taking precedent or priority over data streams assigned as secondary.

The first intermediary device may send information in data streams (1520). The first intermediary device may transmit, provide, or otherwise send the information regarding the identifier and priority for each data stream through the respective data stream. For example, the first intermediary device may send the identifier and priority for a data stream in the data stream itself (e.g., in an insights VC or other VC of the data stream). The first intermediary device may send the identifier and priority in a VC that is uncompressed and/or non-interleaved with other VC(s) in the data stream. The information may be accessed by another computing device (e.g., an SD-WAN, a gateway, or another device in the network link 518) between the first intermediary device and the second intermediary device. In some embodiments, the first intermediary device may commence sending the information over the data stream, upon establishment between the first and second intermediary devices. The information sent via the corresponding data stream may include the identifier for the data stream, such as the globally unique identifier for the session or the stream identifier, among others. The information sent in the respective data stream may include the priority for the data stream, such as: the level of precedence/priority, the type of data stream, the type of data to be exchanged/communicated via the data stream, and/or the definition of the data stream as primary or secondary, among others.

Subsequent to sending the information through the corresponding data streams, the first intermediary device may detect, identify, or otherwise determine an update to the information for at least one of the data streams. The determination may be repeated using the functionalities described above in (1510) and (1515). The update to the information for the data stream may lead to a change to the identifier or the priority, or both. For example, the change to the identifier may include an updated globally unique identifier for the session or an updated stream identifier, among others. The change to the priority may include, for example, an updated level of precedence/priority, the new type of data stream, the new type of data to be exchanged via the data stream, and/or the new definition of the data stream, among others. Upon determining an update to the information, the first intermediary device may send the new information regarding the identifier and the priority for the data stream via the corresponding data stream. The sending of the new information may be performed in the same manner as the functionality in (1520). In this manner, the sending of information via the data stream may be performed through a single port, without reliance on multiple ports by deep parsing CGP and ICA while providing compression and cross-session caching of data transmitted.

L7 Latency Calculation and Communication Independent of Server (Host) Processing Time In some embodiments, ICA/HDX protocol determines Round Trip Time (RTT) using measurement semantics that are different from a level 7 (L7) latency measurement. The ICA/HDX RRT use semantics that are geared towards user experience (UX) or application response time. The ICA RTT calculation is based on a server's response to a client's query. The server's response is sent on the next outgoing packet. However, if an application does not perform an update, e.g., a desktop application is idle, there is no other server-to-client traffic. Hence, the next outgoing packet could be indefinitely delayed, resulting in a measurement that may not be useful.

An App Flow VC monitoring network device (such as NetScaler Gateway or SD-WAN) may also be interested in reporting the end-to-end network latency at Layer 7 of the OSI model between the monitoring network device and the server (e.g., HDX host). This can be an important or useful data point which reflects the network conditions between the monitoring network device and the server, and can also be combined with additional measurements of the network conditions between the end-point and the monitoring appliance for instance. In some embodiments, the network device can calculate the L7 latency accurately by measuring the time taken for a token, referred to as NsRTT (e.g., NetScaler Round Trip Token) leaving the network device and returning back. The carrier channel that brings back the NsRTT from the server includes Server Processing Time (SPT), which can be deducted from the total time, to obtain the actual "network device to server" L7 latency.

Calculating the SPT accurately can be very intricate by virtue of the complex modules and systems involved. One novel aspect lies in the way the system propagates information (timestamp) between the discrete system components and then assimilates it back. As illustrated in FIG. 16, in the sequence 1600, the network device 604 can receive a packet, such as an ICA packet in an ICA stream (1605) from the receiver (e.g., the client-side agent 502). The network device 604 can take a timestamp T1 (1610) and insert a NsRTT token in the packet (e.g., in the ICA packet in the ICA stream) to the server (1615). The server-side WinStation Driver 1202 (sometimes referred to as WDICA) can receive the NsRTT token, can take a timestamp T2 (1620), can record it (e.g., in the Windows Event, using Event Tracing for Windows (ETW) for instance), and can fire an event (1625) (e.g., one or more functions specified by the initial packet to be performed), which then goes into the Windows OS queue and later gets delivered to the Citrix App Flow Service (CtxNsapSvc), for processing (1630). The time it takes for the ETW to reach CtxNsapSvc can be indeterministic.

The CtxNsapSvc, after receiving the ETW, can generate or construct a payload (e.g., JSON payload), and can dispatch or transmit it in an App Flow packet for instance (1635). The payload can include the T2 timestamp previously communicated via the event. Then, the WDICA, which is at a lower layer of the ICA stack and essentially one layer above the network transport module, can recalibrate, adjust, provide and/or update the SPT content in the JSON payload by calculating the true SPT (T3−T2), where T3 is a current timestamp taken by WDICA (e.g., the server-side WinStation Driver 1602) upon receiving the payload or App Flow packet (1640). The WDICA can write the true SPT in a field of the payload (e.g., JSON payload), and can transmit the packet to the network device (1645). The network device 604, responsive to receiving the payload in the packet, can take timestamp T4 and measure the true L7 latency using the SPT. The true L7 latency is equal to T4−T1−(T3−T2) (1650). The network device 604 can send an NSAP packet to the receiver (1655), and the receiver can discard the packets (1660).

Referring now to FIG. 17, depicted is a flow diagram of a method 1700 of calculating latency in application layer (L7) communications independent of host server processing time. The method 1700 may be performed or implemented using any of the components detailed herein, for example, the client 102, the server 106, the appliance 200, or the network device 604, among others. In brief overview, a device may receive a packet (1705). The device may incorporate a token (e.g., flag, bit pattern, indicator, cookie) into the packet at time T1 (1710). The device may cause a duration D relative to time T2 (1715). The device may receive a second packet at T3 (1720). The device may determine whether the packet includes an identifier, e.g., of the device (1725). If the identifier is included, the device may determine a round-trip network time (1730). Otherwise, if the identifier is not included, the device may bypass the determination of the round-trip network time (1735).

In further detail, a device (e.g., the network device 604 or another device in the network link 518) may receive a first packet (1705). The device may identify, intercept, or receive the first packet from another computing device (e.g., the client 102). The first packet may be generated in accordance with an application level protocol (L7), such as a remote desktop protocol (RDP), ICA protocol, and HDX protocol, among others. The first packet may include a header or a payload (sometimes referred herein as a body) in accordance with the application level protocol. In some embodiments, the payload may include a script in accordance with any language, such as Extensible Markup Language (XML), JavaScript, or JavaScript Object Notation (JSON), among others. Furthermore, the first packet may be destined to a recipient (e.g., the server 106) as specified by one of the headers in the first packet. In some embodiments, the first packet may correspond to a request by the client to calculate the round-trip network time. Prior to forwarding, the device may update or modify the first packet to facilitate in calculation of round-trip network time.

The device may incorporate a token into the first packet at time T1 (1710). Upon receipt of the first packet, the device may generate the token (sometimes referred herein as a roundtrip token) to include, insert, or otherwise incorporate into the first packet. The token may be or include a numeric value or a set of alphanumeric characters, and may indicate that the recipient device is to facilitate in the calculation of the round-trip network time between the device and recipient. In some embodiments, the device may embed, add, or insert the token into a portion of the first packet, such as the header and the payload. In some embodiments, the device may also insert, include, or otherwise incorporate at least one identifier (e.g., an entity identifier bit in an App Flow capability) into the first packet upon receipt from the other computing device. The identifier may be or include a numeric value or a set of alphanumeric characters, and may be used to uniquely reference the first packet in traveling through network (e.g., the network link 518) to the recipient device and back to the device. Upon generation, the device may embed, add, or insert the identifier into a portion of the first packet, such as the header or the payload. In incorporating the token (and the identifier), the device may identify or otherwise record a time T1 at which the first packet is transmitted to the server.

The device may cause a server to determine a duration D relative to time T2 (1715). In sending the first packet to the server, the device may trigger or cause the server or a driver running on the server (e.g., the driver 1602) to receive the token. With receipt of the first packet from the device, the server may identify or record a time T2 at which the first packet is received by the server. In some embodiments, upon receipt of the first packet, the server may parse the first packet to extract, obtain, or identify the token from the payload. With the identification of the token, the server may commence determination of the duration D relative to time T2. The duration D may measure or correspond to an amount of time that the server consumes in handling or processing the first packet (e.g., the remainder of the payload in the first packet). In some embodiments, the server may maintain a timer to count or keep track of the duration D.

In response to the first packet, the server may generate a second token to send back to the device. By handling the first packet, the server may cause an application (e.g., App Flow Service or another program) hosted on the server to process the first packet. Based on the received first packet, the application may generate a payload to include the second token. Similar to the first packet, the second packet may be generated in accordance with an application level protocol (L7), such as a remote desktop protocol (RDP), ICA protocol, and HDX protocol, among others. The second packet may include a header or a payload in accordance with the application level protocol. In some embodiments, the payload of the second packet may include a script or information in accordance with any language, such as Extensible Markup Language (XML), JavaScript, or JavaScript Object Notation (JSON), among others. Upon generation of the payload, the application may output, send, or otherwise provide the payload to the driver on the server. The driver in turn may insert, include, or otherwise incorporate the payload into the second packet.

While the second token is generated, the server may use the timer to keep track of the duration D in generating the second token. Upon completion of the generation of the second packet, the server may identify the time counted on the timer as the duration D for generation of the second token. In some embodiments, the server may also use the timer to keep track of time T2a at which the driver is provided with the payload from the application running on the server. Once identified, the server may determine the duration D based on the times T2a and T2 (D=T2a−T2). With the determination, the server may include, insert, or otherwise incorporate the duration D into the second packet. In some embodiments, the server may embed, add, or insert the duration D (or T2a and/or T2) into the portion of the second packet, such as in the header or the payload. In some embodiments, the server may insert, include, or otherwise incorporate the same identifier from the first packet into the second packet, such as in the header or the payload. Upon incorporation, the server may provide, transmit, or send the second packet with the duration D to the server.

The device may receive the second packet at T3 (1720). Subsequent to the transmission, the device may receive the second packet from the server. A set of virtual channels (e.g., virtual channels 506 and 508) may have been established between the client and the server through the device. At least one of the virtual channels may be an insights virtual channel to exchange analytics data between the client and the server. The insights virtual channel may be separate from the other virtual channels and may be non-interleaved with the other virtual channels. The communications exchanged via the insights virtual channel may be uncompressed. The device may receive the second packet via the insights virtual channel from the server. In some embodiments, the header and the payload of the second packet may also be uncompressed. Upon receipt of the second packet, the device may record, determine or identify time T3 at which the second packet was received by the device.

The device may determine whether the second packet includes an identifier (1725). The identifier (e.g., in an entity ID bit or field) may be incorporated into the first packet by the device and into the second packet by the server to reference the packet traveling to the server and back to the device. To determine this, the device may parse the second packet (e.g., in the payload) to extract, find, or identify the identifier. When the identifier is found in the second packet, the device may determine that second packet includes the identifier. On the other hand, when the identifier is not found in the second packet, the device may determine that the second packet does not include the identifier.

If the identifier is included (e.g., indicating that the second packet includes information intended for the device), the device may determine a round-trip network time (sometimes referred herein as the true L7 latency) (1730). The device may determine the round-trip network time in accordance with time T3, T1, and D (or T2a and T2). For example, the device may calculate the round-trip network time as the difference of all three times, T3−T1−D. With the determination, the device may record the round-trip network time for the first packet. In some embodiments, the device may include, insert, or incorporate the round-trip network time into the second packet, such as in the header or the payload. Otherwise, if the identifier is not included, the device may bypass the determination of the round-trip network time (1735). The device may forego the calculation of the round-trip network time. In any event, the device may forward the second packet to the client device. In some embodiments, the device may discard the second packet received from the device. In some embodiments, the device may identify the round-trip network trip (if inserted), prior to discarding.

L7 Latency Calculation and Communication Between Multiple Network Devices

The App Flow VC capability described in connection with FIGS. 15 and 16 may be extended to include an additional field, where each entity (network device or client) may set a previously unused bit as the App Flow VC capability travels from the server to the client (e.g., in an ICA init-request packet). The bit (or field) can be used to uniquely identify each entity. Each entity can record the bit it uses as an Entity ID bit, and can set it in the App Flow VC capability so that it does not get used by other downstream entities.

When a network device inserts an NsRTT token in the ICA stream, the network device can also update or decorate the token with its corresponding Entity ID bit. As the NsRTT token travels in the client-to-server direction, the NsRTT token may also be reused by other network devices in the path by each adding/setting its corresponding Entity ID bit.

The SPT computation and the creation of L7 latency App Flow data point at the server can proceed as described above, except that the server can insert the combined Entity ID bits in the L7 latency App Flow data point. Each network device in the path can interpret the L7 latency App Flow data point as described above, except that the network device can ignore the data point unless it has its specific assigned Entity ID bit set.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

What is claimed is:

1. A method, comprising:
incorporating, by a device intermediary between a client device and a server, a token to a first packet at a time T1, the server comprising a driver to provide the client device access via a desktop session to at least one of a plurality of virtual applications executable on the server, the first packet identifying a virtual application of the plurality of virtual applications to be accessed by the client device via the desktop session;
sending, by the device, the first packet to the server, to cause:
the driver of the server to identify, responsive to receiving the first packet, the virtual application of the plurality of virtual applications to be accessed via the desktop session,
the driver to identify, responsive to the token in the first packet, a time T2 corresponding to an invocation of the virtual application identified in the first packet,
the virtual application of the server to generate a payload based at least on the first packet and to return the payload to the driver at time T2a, and
the driver to determine, responsive to the token, a duration D corresponding to a difference between T2a and T2 from the virtual application processing the first packet, and
the driver to send a second packet including the payload and the duration D to the device;
receiving, by the device from the server, the second packet with the payload at a time T3; and
determining, by the device, a round-trip network time of an application layer for communications of the virtual application executing on the server accessed via the desktop session, according to T3−T1−D.

2. The method of claim 1, further comprising:
receiving, by the device, the first packet from the client device; and
recording, by the device, the time T1.

3. The method of claim 1, wherein the payload is in javascript object notation (JSON) format.

4. The method of claim 1, comprising receiving, by the device, the second packet in an insights virtual channel (VC) established between the client device and the server.

5. The method of claim 4, wherein the insights VC is non-interleaved with other VCs established between the client device and the server, and the payload in the second packet comprises uncompressed data.

6. The method of claim 1, further comprising:
incorporating, by the device, an identification of the device in the first packet; and
determining, by the device, the round-trip network time if the second packet includes the identification of the device.

7. The method of claim 6, further comprising:
receiving, by the device, a third packet from the server; and
bypassing a determination of the round-trip network time according to the third packet, if the identification of the device is absent in the third packet.

8. The method of claim 1, wherein the first packet identifies the application to be accessed by the client device in the remote desktop session established between the client device and the device for accessing the plurality of virtual applications.

9. A device intermediary between a client device and a server, comprising:
at least one processor configured to:
incorporate a token to a first packet at a time T1;
send the first packet to the server, the server comprising a driver to provide the client device access via a desktop session to at least one of a plurality of virtual applications executable on the server, the first packet identifying a virtual application of the plurality of virtual applications to be accessed by the client device via the desktop session, to cause:
the driver of the server to identify, responsive to receiving the first packet, the virtual application of the plurality of virtual applications to be accessed via the desktop session
the driver to identify, responsive to the token in the first packet, a time T2 corresponding to an invocation of the virtual application identified in the first packet,
the virtual application of the server to generate a payload based at least on the first packet and to return the payload to the driver at time T2a, and
the driver to determine, responsive to the token, a duration D corresponding to a difference between T2a and T2 from the virtual application processing the first packet, and
the driver to send a second packet including the payload and the duration D;
receive, from the server, the second packet with the payload at a time T3; and
determine a round-trip network time of an application layer for communications of the virtual application executing on the server accessed via the desktop session, according to T3−T1−D.

10. The device of claim 9, wherein the at least one processor is further configured to:
receive the first packet from the client device; and
record the time T1.

11. The device of claim 10, wherein the at least one processor is further configured to:
receive a third packet from the server; and
bypassing a determination of the round-trip network time according to the third packet, if the identification of the device is absent in the third packet.

12. The device of claim 9, wherein the payload is in javascript object notation (JSON) format.

13. The device of claim 9, wherein the at least one processor is configured to receive the second packet in an insights virtual channel (VC) established between the client device and the server.

14. The device of claim 13, wherein the insights VC is non-interleaved with other VCs established between the client device and the server, and the payload in the second packet comprises uncompressed data.

15. The device of claim 9, wherein the at least one processor is further configured to:
incorporate an identification of the device in the first packet; and
determine the round-trip network time if the second packet includes the identification of the device.

16. The device of claim 9, wherein the first packet identifies the application to be accessed by the client device in the remote desktop session established between the client device and the at least one processor for accessing the plurality of virtual applications.

17. A non-transitory computer readable medium storing program instructions for causing one or more processors in a device to:

incorporate a token to a first packet at a time T1, wherein the device is intermediary between a client device and a server, the server comprising a driver to provide the client device access via a desktop session to at least one of a plurality of virtual applications executable on the server, the first packet identifying a virtual application of the plurality of virtual applications to be accessed by the client device via the desktop session;

send the first packet to the server, to cause:

the driver of the server to identify, responsive to receiving the first packet, the virtual application of the plurality of virtual applications to be accessed via the desktop session, the driver to identify, responsive to the token in the first packet, a time T2 corresponding to an invocation of the virtual application identified in the first packet, the virtual application of the server to generate a payload based at least on the first packet and to return the payload to the driver at time T2a, the driver to determine, responsive to the token, a duration D corresponding to a difference between T2a and T2 from the virtual application processing the first packet, and the driver to send a second packet including the payload and the duration D to the device;

receive, from the server, the second packet with the payload at a time T3; and determine a round-trip network time of an application layer for communications of the virtual application executing on the server accessed via the desktop session, according to T3−T1−D.

18. The non-transitory computer readable medium of claim 17, wherein the program instructions further cause the one or more processors to:

receive the first packet from the client device; and record the time T1.

19. The non-transitory computer readable medium of claim 17, wherein the program instructions further cause the device to receive the second packet in an insights virtual channel (VC) established between the client device and the server.

20. The non-transitory computer readable medium of claim 17, the first packet identifies the application to be accessed by the client device in the remote desktop session established between the client device and the device for accessing the plurality of virtual applications.

* * * * *